United States Patent
Morgan et al.

(10) Patent No.: US 11,829,897 B2
(45) Date of Patent: *Nov. 28, 2023

(54) COMPUTER IMPLEMENTED METHODS AND SYSTEMS FOR PROJECT MANAGEMENT

(71) Applicants: Atlassian Pty Ltd., Sydney (AU); Atlassian Inc., San Francisco, CA (US)

(72) Inventors: Ben Morgan, Brisbane (AU); Cyprien Autexier, Sydney (AU); Andre Van der Schyff, Sydney (AU); Seung Yeon Sa, Sydney (AU); Daniel Annesley, Sydney (AU); Pavel Vlasov, Sydney (AU); Waiyee Loo, Sydney (AU); Albert Kavelar, Sydney (AU); Lukas Maczejka, Vienna (AT); Martin Sturm, Vienna (AT); Paul Glantschnig, Vienna (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,670

(22) Filed: Dec. 6, 2021

(65) Prior Publication Data
US 2022/0092517 A1 Mar. 24, 2022

Related U.S. Application Data

(63) Continuation of application No. 16/808,812, filed on Mar. 4, 2020, now Pat. No. 11,205,146.
(Continued)

(51) Int. Cl.
*G06Q 10/06* (2023.01)
*G06Q 10/0631* (2023.01)
(Continued)

(52) U.S. Cl.
CPC . *G06Q 10/063112* (2013.01); *G06F 3/04817* (2013.01); *G06F 3/04883* (2013.01);
(Continued)

(58) Field of Classification Search
None
See application file for complete search history.

(56) References Cited

U.S. PATENT DOCUMENTS

| | | | | |
|---|---|---|---|---|
| 2008/0195452 A1* | 8/2008 | Ponce de Leon | .. | G06Q 10/0635 705/7.12 |
| 2009/0055228 A1* | 2/2009 | Henry | .................... | G06Q 10/10 705/7.17 |

(Continued)

FOREIGN PATENT DOCUMENTS

WO  WO-2017158588 A1 *  9/2017  ......... G06F 3/04817

*Primary Examiner* — Patricia H Munson
*Assistant Examiner* — Marjorie Pujols-Cruz
(74) *Attorney, Agent, or Firm* — Brownstein Hyatt Farber Schreck, LLP

(57) ABSTRACT

A method including operations of displaying a scheduling interface including a first work item user interface element corresponding to a first work item, the first work item user interface element displayed to visually indicate a scheduled start date of the first work item and a scheduled end date for the first work item; receiving forecast data generated in respect of the first work item; determining, based on the forecast data, a first forecast range in respect of the first work item; and displaying a first forecast user interface element on the scheduling interface, the first forecast user interface element corresponding to the first work item and having an appearance based on the first forecast range.

20 Claims, 19 Drawing Sheets

Related U.S. Application Data

(60) Provisional application No. 62/976,562, filed on Feb. 14, 2020.

(51) Int. Cl.
*G06F 17/18* (2006.01)
*G06Q 10/04* (2023.01)
*G06F 3/04817* (2022.01)
*G06F 3/04883* (2022.01)
*G06Q 10/10* (2023.01)
*G06Q 10/109* (2023.01)
*G06F 3/04842* (2022.01)

(52) U.S. Cl.
CPC .............. *G06F 17/18* (2013.01); *G06Q 10/04* (2013.01); *G06Q 10/06316* (2013.01); *G06Q 10/103* (2013.01); *G06Q 10/109* (2013.01); *G06F 3/04842* (2013.01)

(56) References Cited

U.S. PATENT DOCUMENTS

| | | | |
|---|---|---|---|
| 2011/0302090 A1* | 12/2011 | Newpol | G06Q 10/103 705/348 |
| 2016/0063192 A1 | 3/2016 | Johnson et al. | |
| 2019/0236516 A1 | 8/2019 | Ponnusamy | |

\* cited by examiner

COMPUTER IMPLEMENTED METHODS AND SYSTEMS FOR PROJECT MANAGEMENT

CROSS-REFERENCE TO RELATED APPLICATION(S)

This application is a continuation patent application of U.S. patent application Ser. No. 16/808,812, filed Mar. 4, 2020 and titled "Computer Implemented Methods and Systems for Project Management," which is a nonprovisional patent application of and claims the benefit of U.S. Provisional Patent Application No., 62/976,562, filed Feb. 14, 2020 and titled "Computer Implemented Methods and Systems for Project Management," the disclosures of which are hereby incorporated herein by reference in their entireties.

TECHNICAL FIELD

The present disclosure is directed to computer implemented methods and systems for project management.

BACKGROUND

Various computer implemented project management tools exist. At a very general level, such tools are used to assist in planning and executing projects. Amongst other things, planning a project can involve determining various work items involved in an overall project and scheduling those work items in order to complete the project.

Scheduling work items to complete a project is a complex and difficult job. This is particularly the case as project complexity increases, for example due to the number of work items, the number of teams/individuals available to work on work items, and work item interdependencies.

Furthermore, the impact of a poorly scheduled project can be significant. At the project level, a roadmap that goes awry can lead to the deliverable of the project being delayed. At a work item level, work items are often interdependent and therefore a work item schedule going awry can have a cascading effect on any downstream work items that are directly or indirectly related.

Figure 1:
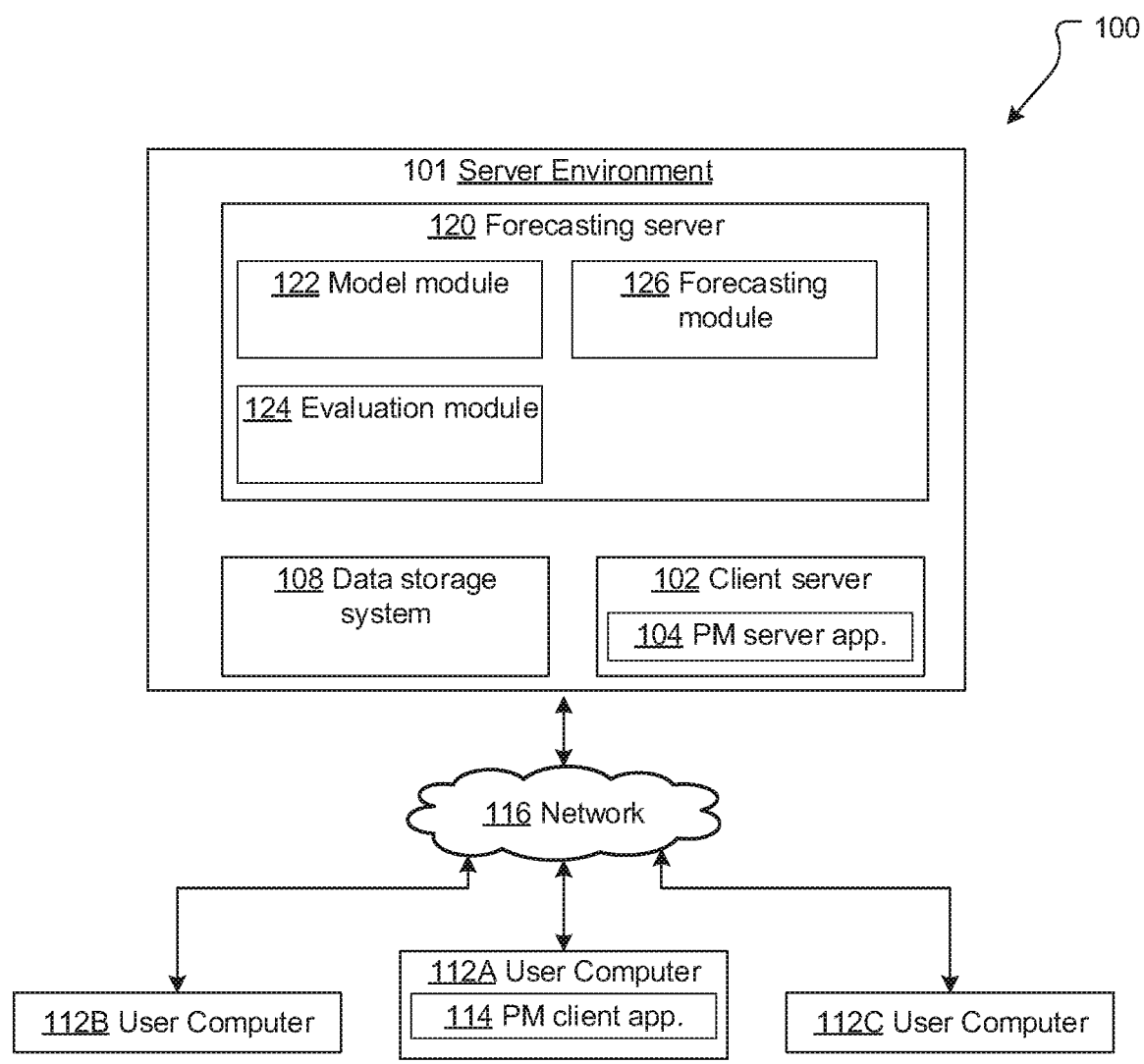
FIG. 1 is a diagram depicting a networked environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

Overview

The present disclosure generally relates to systems and computer implemented methods for creating, editing, and/or visualizing project schedules. In particular, embodiments described herein provide systems and methods for generating work item forecasts and user interfaces for displaying such forecasts.

Also described herein are user interface for creating, editing, and/or visualizing work items of a project and dependencies between work items.

As used herein, a work item is any task or set of tasks that forms part of a project. By way of example, in agile methodologies (initially used for software development but increasingly being used for other, non-software development projects) large projects are typically broken up into epics. Epics, in turn, are broken up into stories (the basic work item for a project, also referred to as issues in the Jira project management tool). Depending on the size and scope of a project, multiple epics may be grouped into an initiative (the project having one or more initiatives).

In the present context, therefore, stories, epics (groups of related stories), and initiatives (groups of related epics) are work items of a project.

Alternative project management methodologies may have alternatively named work items. Further, some project management tools provide mechanisms for users to create their own work items—e.g. projects, tasks, sub-tasks or any other named work items. The relevant factor, again, is that a work item is a work item or set of work items that form part of a project.

Often, as is the case in agile methodology, work item types will be hierarchical. For example, a project (the top or level 1 of the hierarchy) may be made up of one or more initiatives (level 2 of the hierarchy), each initiative may be made up of one or more epics (level 3 of the hierarchy), and each epic may be made up of one or more stories (level 4 of the hierarchy). A hierarchy of work item types is not, however, required.

Work items have associated work item information. The specific information associated with a work item, and the manner in which it is stored, will depend on the project management tool in question. By way of example, however, work item information may include information such as: a project identifier identifying the project the work item belongs to; a work item identifier uniquely identifying the work item or, at least uniquely identifying the work item within the project the work item belongs to; a work item type, identifying the type of work item (e.g. an initiative, an epic, a story, a task, a sub-task, or other work item type relevant to the project); a creator identifier identifying the creator of the work item; a creation date indicating the date the work item was created; a work item title; a work item description providing information in respect of the work item (e.g. the work required); a scheduled (or planned) start indicating the date/time work on the work item is scheduled to start (may be blank); a scheduled (or planned) end indicating the date/time work on the work item is scheduled to end (may be blank); an actual start indicating the date/time work on the work item is actually started (may be blank); an assignee ID indicating the resource (e.g. an individual or team) to which the work item has been assigned; an actual end time indicating the date/time work on the work item actually ended (may be blank).

Work item information for a given work item may be stored in a data structure such as the table below (though alternative data structures providing for additional/fewer/alternative items of work item information are possible):

| |
|---|
| Project identifier |
| Work item identifier |
| Work item type |
| Creator ID |
| Date created |
| Work item title |
| Work item description |
| Scheduled start |
| Scheduled end |
| Assignee ID |
| Actual start |
| Actual end |

Different types of work items may have different associated work item information. For example, a work item may also have a parent work item identifier identifying a parent of the work item. For example if the work item is a story type work item the parent work item identifier could identify an epic to which the story belongs.

Other work item information can include: a story points value indicating an estimated complexity of the work item; an assignments restriction value indicating any restrictions as to teams or individuals who can work on the story; a skill requirement value indicating any skills that must be held by a team or individual to work on the story; an earliest start date indicating a date before which work on the story cannot commence; a work slot restriction indicating a work slot (or work slots) that the story is to be completed in.

In the present context, a work slot is the atomic period of work defined for a given project. By way of example, in agile methodology work slots are typically referred to as sprints, and may have any defined length (e.g. one or more hours, one or more days, one or more weeks, one or more months etc.).

In the present context, work items are assigned to assignees. A give work item may be assigned to one or more teams and/or one or more individuals. A given team includes one or more members. Generally speaking, a given team member will have associated data such as availability (e.g. normal hours/days worked) and skills (e.g. identifiers of any particular skills the team member has). For a given team, a given member may also have a capacity—e.g. a percentage of the member's total capacity that is devoted to that team. The set of members of a team defines the overall skills for the team (the combination of the all team member skills) and overall team capacity (the combination of all team member capacities).

As used herein, a dependency between work items indicates that one work item is dependent on another. Each work item involved in a dependency relationship is referred to as having a role. In the present specification, a given dependency relationship is between an incoming work item and outgoing work item, the relationship being such that the incoming work item must be completed before the outgoing work item can commence (or, phrased in the reverse, the outgoing work item cannot commence until completion of the incoming work item—and is therefore dependent on the incoming work item).

Various terminologies can be used to describe a dependency relationship and the work items associated therewith. By way of example, the following terminologies all describe a dependency relationship where a first work item is the incoming work item and a second work item is the outgoing work item: the first work item blocks the second work item; the first work item is needed by the second work item; the first work item is depended upon by the second work item. The reverse of these relationships can also be described: the second work item is blocked by the first work item; the second work item needs the first work item; the second work item depends on the first work item.

A dependency between two work items may be referred to as having a direction. For example, dependency between work item A and work item B may have the direction A to B (indicating that work item A is the incoming work item and blocks work item B which is the outgoing work item) or the direction B to A (indicating that work item B is the incoming work item and blocks work item A which is the outgoing work item).

A dependency relationship may be between work items of different types. For example, and continuing with the agile methodology work items described above: a first story in a first epic may block a second story from the same epic; a first story in a first epic may block a second story from a second (different) epic—in which case the second epic is blocked by the first story; a first epic may block a second epic (in the same or a different initiative as the first epic); a first epic in a first initiative may block a second epic from a second (different) initiative—in which case the second initiative is blocked by the first initiative; a first initiative may block a second initiative.

A given work item may be involved in multiple dependency relationships. For example, a first dependency relationship may define that work item A depends on (is blocked by) work item B, and a second dependency relationship may define that work item B depends on (is blocked by) work item C. In this case, work item B is the outgoing work item in the first dependency relationship and the incoming work item in the second dependency relationship.

Once created, a dependency may be recorded in various ways. For example, in certain implementations each dependency has associated dependency information that includes an incoming work item identifier (identifying the incoming work item) and an outgoing work item identifier (identifying the outgoing work item). Dependency information can also include, for example, a creator identifier identifying the creator of the dependency, a creation date indicating the date the dependency was created, and/or any other relevant information.

Dependency information for a given dependency may be stored in a data structure such as the table below (though alternative formats providing for additional/fewer/alternative items of dependency information are possible):

| |
|---|
| Incoming work item ID |
| Outgoing work item ID |
| Creator ID |
| Date created |

Dependencies as described herein may be broken or non-broken. A non-broken dependency is a dependency in which a first work item is blocked by (dependent on) a second work item and the first work item has a scheduled start that is after the scheduled end of the second work item.

Broken dependencies described herein will be referred to as schedule-broken dependencies or forecast-broken dependencies.

A schedule-broken dependency is a dependency that is broken based on scheduled start/end dates of the work items associated with the dependency. For two work items in a dependency relationship, a schedule-broken dependency can occur where a first (outgoing) work item is blocked by (dependent on) a second (incoming) work item, but the first work item has a scheduled start that is before the scheduled end of the second work item.

A forecast-broken dependency is a dependency that is broken based on forecast start/end dates of the work items associated with the dependency. For two work items in a dependency relationship, a forecast-broken dependency can occur where: a forecast end date (or a date in the forecast end date range) of the incoming work item is later than the forecast start date (or a date in the forecast start date range) of the outgoing work item; a forecast end date (or a date in the forecast end date range) of the incoming work item is later than the scheduled start date of the outgoing work item; the scheduled end date of the incoming work item is later than the forecast start date (or a date in the forecast start date range) of the outgoing work item.

The techniques and features described herein may be employed within any appropriate project management (PM) tool. One example of such a tool is Jira made available by Atlassian. Such a tool allows (inter alia) users to create projects, define work items associated with a project (e.g. stories, epics, initiatives, and/or other work items), assign resources to work items (e.g. individuals, teams, or other resources), and schedule work items over time (e.g. set start and/or end times for work items).

Initially, an example environment in which the features of the present disclosure can be implemented and computer processing system will be described. Following this, various user interface features for displaying, creating, and editing work item dependencies and associated information are described.

Networked Environment

As noted, the various features described herein are implemented within the context of a computer implemented project management tool. In certain implementations, the project management tool is implemented in a client-server architecture in which a client application (e.g. computer readable instructions and data) runs on an end-user computer system and communicates with a server application running on a server system, the client and server applications operating together to perform the various features and functions described herein.

FIG. 1 provides an example client server architecture 100, and the embodiments will be described with reference to this architecture.

Client server architecture 100 comprises a server environment 101. Server environment includes a client server 102 which hosts a project management server application 104 (which will be referred to as the SA 104) which, when executed by the client server 102 configures it to provide server-side functionality. The SA 104 comprises one or more application programs, libraries, APIs or other software elements that implement the features and functions that are further described herein.

Server environment 101 also includes a data storage system 108 (e.g. one or more database servers and associated physical data storage media or alternative data storage means).

Server environment 101 also includes a forecasting server 120 which, in turn, hosts a model generation module 122, a model evaluation module 124, and a forecasting module 126. The different systems/servers of the server environment 101 are configured to communicate with one another either directly or, more typically, via one or more networks. The one or more networks may be a local area network, a public network such as network 116, or a combination thereof.

Architecture 100 also comprises a user computer 112. User computer 112 hosts a project management client application 114 (which will be referred to as the CA 114). When executed by the user computer 112, the CA 114 configures the user computer 112 to provide client-side functionality.

CA 114 may be a general web browser application (such as, for example, Chrome, Safari, Internet Explorer, Opera). In this case the CA 114 accesses the SA 104 via an appropriate uniform resource locator (URL) and communicates with the SA 104 via general world-wide-web protocols (e.g. http, https, ftp). The web browser application is configured to request, render and display electronic documents that conform to a markup language such as HTML, XML or extensions, and may be capable of internally executing browser-executable code. Where the CA 114 is a web browser, the SA 104 will be a web server (such as, for example, Apache, IIS, nginx, GWS).

Alternatively, the CA 114 may be a specific application programmed to communicate with SA 104 using defined application programming interface (API) calls. In this case the SA 104 will be a specific application server configured to interact with the CA 114.

A user computer 112 may host more than one CA 114 (for example a general web browser client and a specific application client). Similarly, client server 102 may host more than one SA 114.

The client server 102 may serve multiple user computers 112 (or, more specifically, multiple client applications 114). In FIG. 1 three user computers have been depicted (112A, 112B, and 112C), though more or fewer are possible.

The client server 102 and user computer(s) 112 communicate data between each other either directly or indirectly through one or more communications networks 116.

Further alternative system implementations/architectures are possible.

For example, in certain implementations server environment 101 maybe a cloud based environment. In this case, the server environment 101 provides the project management software in a software-as-a-server model, and environment 101 may host multiple project management system instantiations for multiple clients (referred to as tenants). In this case, at least the client server 102 will be a clustered architecture: i.e. multiple physical computer systems hosting multiple server instances (or nodes) which can be instantiated as required to meet system demand.

Similarly, while a single forecasting server 120 is depicted, multiple forecasting servers could be provided (for example, one forecasting server to perform the functionality of the model generation module 122, another to perform the functionality of the evaluation module 124, and another to perform the functionality of the forecasting module 126.

As another example, some or all of the functionality described herein may be provided in a stand-alone implementation, e.g. a stand-alone software application that is executed by a single computer system to provide the features and functions described herein without need of a server system.

The client server 102 may be any computer processing system which is configured (or configurable) by hardware and/or software to provide the server-side functionality described herein. Similarly, user computer 112 may be any computer processing system which is configured (or configurable) by hardware and/or software to provide client-side functionality as described herein. By way of example, suitable client and/or server systems may include: server computer systems, desktop computers, laptop computers, netbook computers, tablet computing devices, mobile/smart phones, personal digital assistants, and other computer devices/systems.

One example of a computer processing system is described below with reference to FIG. 2, described in the next section.

Computer Processing System

The features and techniques described herein are implemented using one or more computer processing systems.

Figure 2:
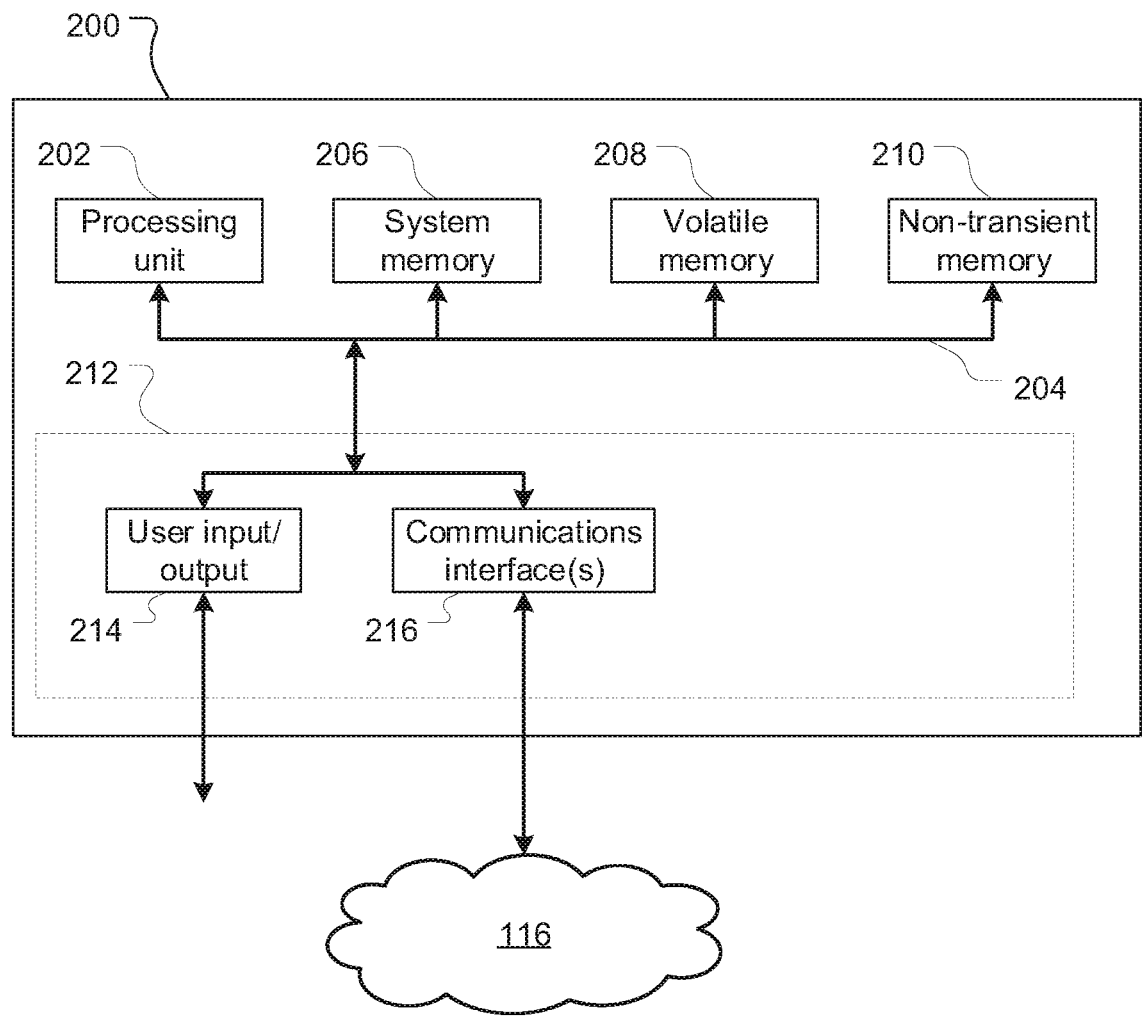
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical work items of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer work items than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances all processing will be performed by processing unit 202, however in other instances processing may also be performed by remote processing devices accessible and useable (either in a shared or dedicated manner) by the system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 may also connect to one or more communications networks (e.g. the Internet, a local area network, a wide area network, a personal hotspot etc.) to communicate data to and receive data from networked devices, which may themselves be other computer processing systems.

System 200 may be any suitable computer processing system such as, by way of non-limiting example, a server computer system, a desktop computer, a laptop computer, a netbook computer, a tablet computing device, a mobile/smart phone, a personal digital assistant, or other computing device/system.

Typically, system 200 will include at least user input and output devices 214 and a communications interface 216 for communication with a network such as network 116 of environment 100.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft Windows, Apple macOS, Apple iOS, Android, Unix, or Linux.

System 200 also stores or has access to applications which, when executed by the processing unit 202, configure system 200 to perform various computer-implemented processing operations described herein. For example, and referring to the FIG. 1 above, client server 102 includes a project management server application 104 which configures the client server 102 to perform the described server system operations, and user computer 112 includes a project management client application 114 which configures the user computer 112 to perform the described client system operations, In some cases part or all of a given computer-implemented method will be performed by system 200 itself, while in other cases processing may be performed by other devices in data communication with system 200.

Project Management User Interface

Figure 3:
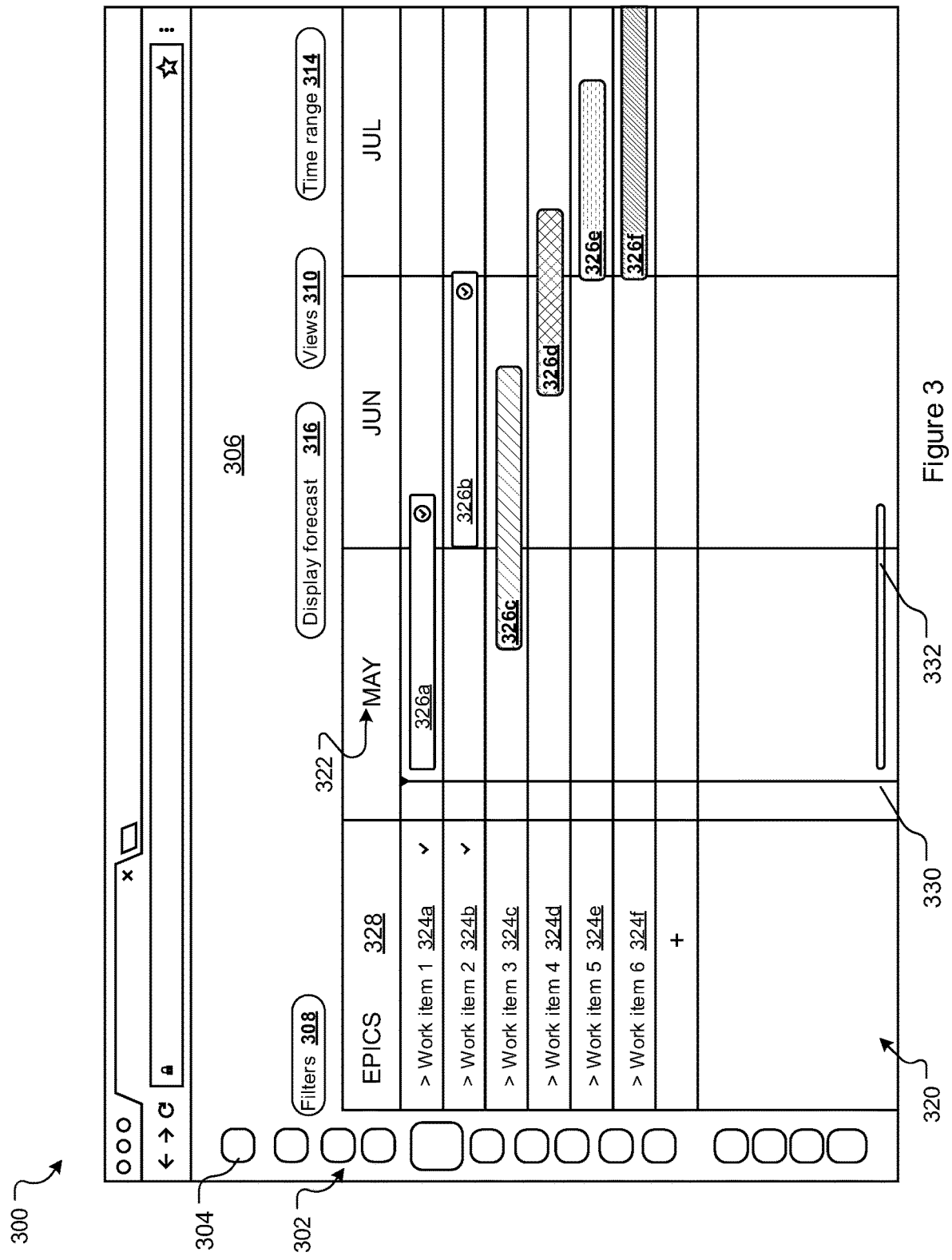
FIG. 3 depicts an example user interface.

FIG. 3 provides an example user interface 300. User interface 300 is displayed on a display/touch screen display of a user computer such as user computer 112. The user interface is generated by the client application (CA) 114 (in conjunction with an operating system of the user computer 112).

As noted, in the described embodiments the PM tool operates on a client server architecture. Accordingly, data displayed in user interface 300 includes data provided by the server application (SA) 104 and interaction with the user interface causes the CA 114 to communicate data back to the SA 104 (e.g. to be processed and saved in data storage system 108).

User interface 300 includes a control panel 302 which, in turn, includes a number of PM tool controls 304. Various controls 304 can be provided and generally speaking provide a user with access to various functions provided by the PM tool. These include creating/editing and saving projects and work items thereof.

User interface 300 includes scheduling interface 306. In this example, scheduling interface 306 includes a filters control 310, a views control 312, a time range control 314, a display forecast control 316, and a timeline interface 320.

When the CA 114 detects user interaction with the filters control 308 the CA 114 displays further user interface (UI) elements (e.g. via a drop down menu, overlay menu, or other UI tool) that can be used to select various filters that determine the work item UI elements 326 (discussed below) displayed in the timeline interface 320. For example, the CA 114 may display additional controls which can be used to display/hide display of particular types of work items, display/hide display of work items assigned to/not assigned to a particular team or individual, and/or apply other filters.

When the CA 114 detects user interaction with the time range control 314, the CA 114 displays further UI elements that can be used to select the time range covered by the timeline interface 320 (e.g. a from date and to date) and/or the time granularity depicted by the timeline interface 322—e.g. days, weeks, months, quarters, years, etc.

When the CA 114 detects user interaction with the display forecast control 316, the CA 114 causes forecasting information to be displayed (as described further below).

Timeline interface 320 in this example is a grid with time on a horizontal axis and work items of a project currently being viewed on a vertical axis. In alternative implementations these axes could be switched.

In the present example, the time range covered by the timeline interface is indicated by column labels 322 at the top of each column. In this case the time granularity is months and the time range is May, June, July and part of August.

The work items displayed on the timeline interface indicated by row labels 324 at the left of each row. In this case six work items are displayed, with labels work item 1 through to work item 6 (324a-324f). In an actual implementation the work item titles may be used in place of generic labels as shown.

Timeline interface 320 further includes work item UI elements 326. Each work item UI element corresponds to a work item of the project being displayed. In this case six work item UI elements are shown (326a-326f) corresponding to work items 1 to 6 (per row labels 324a to 324f).

In this example, each work item UI element 326 is generally rectangular in shape. The element horizontally aligned in its row (as defined by its corresponding row label 324) and vertically aligned according to the scheduled start and end times of the work item represented by the UI element.

In timeline interface 320 the timeline runs from left (earlier times) to right (later times) and therefore the leftmost end of the work item UI element aligns with (or approximately with) the scheduled start time of the corresponding work item, and the rightmost end of the work item UI element aligns with (or approximately with) the scheduled end time of the corresponding work item. For example, work item UI element 326B occupies all of the 'June' column and a small portion of the 'July' column, indicating that the work item represented by work item UI element 326B has a scheduled start of approximately 1 June and a scheduled end of approximately 1 July. The timeline control 320 may be provided with additional columns or other visual indicators to allow start and end times to be more precisely displayed (e.g. providing vertical lines or the like and/or column headers corresponding to days rather than years). Where a scheduled start or end of a work item is before the start or after the end of the time range displayed by the timeline interface the corresponding work item UI element continues off page (e.g. as is the case with work item UI element 326*f*).

In the present example, work item UI elements are provided with different visual appearances. For example, work item UI elements corresponding to finished work items have a first appearance (in this case a solid grey shading— e.g. UI elements 326*a* and 326*b*). In addition, work item UI elements corresponding to finished work items are provided with a finished graphic (in this case a tick symbol).

By way of further example, work item UI elements corresponding to non-finished work items may be provided with a visual appearance based on the resource (e.g. individual or team) that the work item has been assigned to. In interface 300: UI element 326*c* has a second visual appearance (in this case indicated by vertical lines); UI element 326*d* has a third visual appearance (in this case indicated by oblique lines); UI element 326*e* has a fourth visual appearance (in this case indicated by hatched lines); and UI element 326*f* has the second visual appearance (i.e. the same visual appearance as UI element 326*c*). These different visual appearances indicate that work items corresponding to UI elements 326*c* and 326*f* are assigned to the same resource, the work item corresponding to UI element 326*d* is assigned to a different resource, and the work item corresponding to UI element 326*e* is assigned to a different resource again.

Providing work item UI elements 326 with different appearances can be achieved in various ways—e.g. different colors, different fill patterns, a combination of these or any other visually distinguishing attributes.

Figure 14:
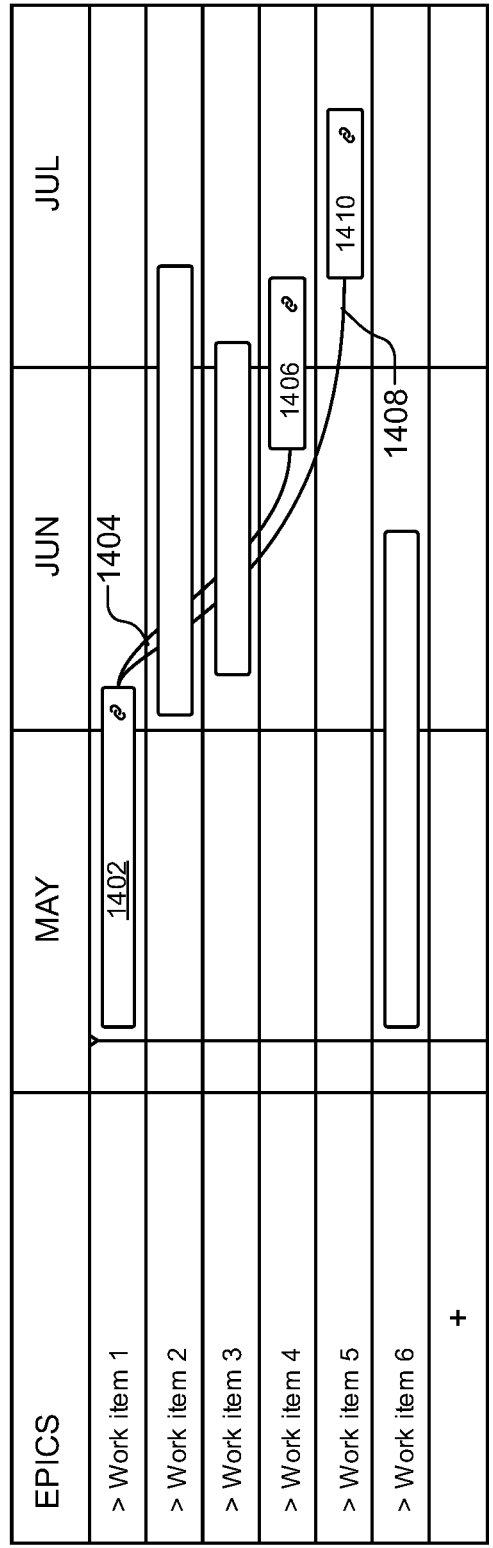
FIG. 14 depicts an example user interface.
Figure 15:
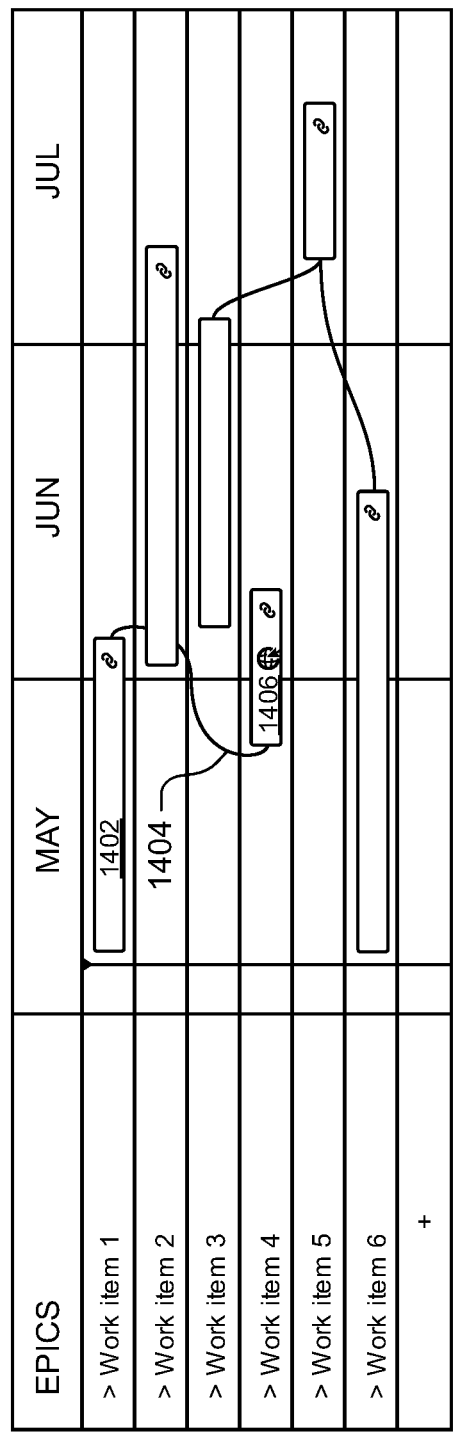
FIG. 15 depicts an example user interface.

In certain embodiments, the CA 114 is configured to permit user interaction with work item UI elements to change the scheduled start and end of the associated work item. For example, and in the present context where work items are displayed in rows, the CA 114 can be configured to allow a user to drag a work item UI element left or right along its row. This causes the scheduled start and end of the corresponding work item to change according to where along the timeline the work item UI element is positioned. In the present example where the timeline runs from left to right, dragging a work item UI element to the left makes its scheduled start and end earlier, and dragging to the right makes its scheduled start and end later. One example of this is illustrated in FIGS. 14 and 15 as described below.

In this example, the column header of the leftmost row has a work item label 328. The work item type label 326 indicates the highest hierarchy-level work item type being displayed. In the example of FIG. 3, label 326 indicates that 'epics' are the highest level work item type being displayed (i.e. that initiatives are not displayed). In the present example, the highest level work item type being displayed can be selected by the filters control 308—for example a user could (via interaction with the filter control 308) select a different highest level work item type, e.g. so that stories are the highest level work item type shown.

Timeline interface 320 of the present example also includes a current date indicator 330, in this case a vertical line aligning with the current date.

The work item UI elements 326 (and labels 324) displayed in the timeline interface 320 depend on the currently active filters (set by default or user interaction with the filters control 308) and current time range (set by default or user interaction with the time range control 314). For example, any work item that has a scheduled end before the start of the selected time range or a scheduled start after the end of the selected time range will not have a corresponding work item UI element 326 displayed in the timeline interface.

Timeline interface 320 of the present example also includes a horizontal scroll bar 332 allowing a user to change the currently displayed time range displayed. Where there are more work items than can fit in the interface a vertical scroll bar can be provided to scroll vertically and change the currently displayed work items.

The present disclosure involves the CA 114 detecting user interaction with various user interface elements. The CA 114 can be configured to provide for and detect various forms of user interaction with any given UI element. Example user interactions the CA 114 can be configured to provide/detect for a given UI feature or element are described below.

Where a touch sensitive display is the input (and output) device, user interaction with a UI element can include: detecting a tap gesture at a position on the display corresponding to the UI element (e.g. a contact with the touch sensitive display that is released within a predetermined, relatively short period of time—e.g. less than one second); detecting a dwell gesture at a position on the display corresponding to the UI element (e.g. detecting contact on the touch sensitive display that is maintained for at least a predetermined, relatively longer period of time—e.g. 1 second); detecting a swipe gesture commencing at a position on the display corresponding to the UI element; detecting a swipe gesture terminating at a position on the display corresponding to the UI element.

Where a mouse or other pointing device is the input device, user interaction with a UI element can include: detecting a button click, button double click, or specific button click (e.g. right click) while a cursor controlled by the pointing device is positioned over the UI element; detecting a cursor controlled by the pointing device hovering over the UI element for at least a predetermined time period (e.g. 0.5 seconds).

Where a keyboard or keypad is the input device, user interaction with a UI element can include: detecting activation of a particular key; detecting activation of a combination of keys in sequence; detecting activation of a combination of keys concurrently.

Alternative input devices and user interactions are possible. While specific user interactions are described to provide examples it will be appreciated that in other implementations alternative user interactions may be provided for/detected by the CA 114.

Work Item Dependencies

This section describes additional features related to work item dependencies.

For clarity, many features of user interface 300 described above are not shown in the following Figures. The interface features shown in these Figures can, however, be included in a broader user interface such as scheduling interface 300 (or, more specifically, timeline interface 320). Alternatively, the interface features shown in the following Figures can be incorporated into an alternative project management tool user interfaces.

Use of the same reference numerals indicate that a feature is the same as or similar to the feature as originally described.

Figure 4:
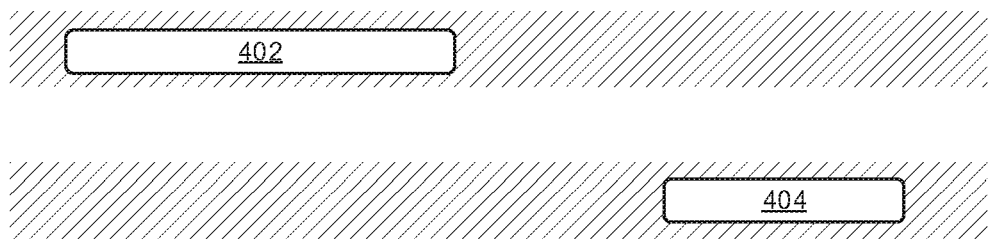
FIG. 4 depicts two work item user interface elements.

FIG. 4 depicts two work item UI elements 402 and 404.

Figure 5:
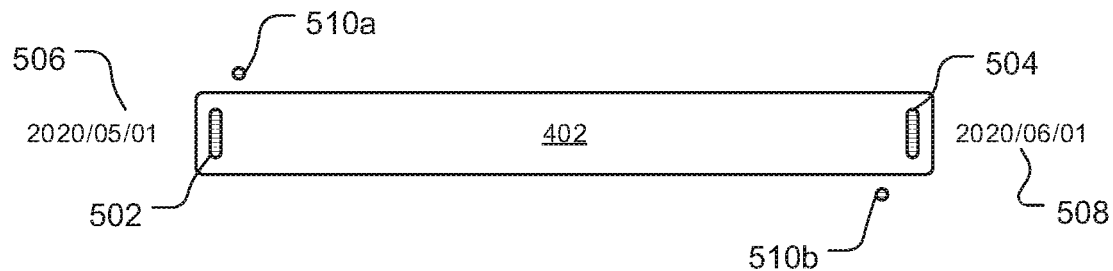
FIG. 5 depicts a work item user interface element with additional controls.

FIG. 5 depicts an enlarged work item UI element 402 which includes additional work item controls. In the present embodiment, the additional work item controls are displayed in response on the CA 114 detecting a display additional control user interaction with a work item UI element. As described above, various user interactions are possible. By way of specific example, a suitable display additional control interaction may be hovering over, dwelling over, clicking, or contacting the work item UI element 402.

In FIG. 5, the additional work item controls include: an adjust scheduled start control 502; an adjust scheduled end control 504; a scheduled start date label 506; a scheduled end date label 508; and two create dependency controls 510: a create blocked-by dependency control 510a; and a create blocking dependency control 510b.

The adjust scheduled start and adjust scheduled end controls can be interacted with to adjust (respectively) the scheduled start and end of the work item that the UI element corresponds to. For example, a user can interact with these controls to drag them away from or toward the center of the UI element 402. E.g. in the left-to-right timeline context, dragging the adjust scheduled start control to the left (away from the center of the UI element) will make the scheduled start earlier, while dragging it to the right (toward the center of the UI element) will make the scheduled start later. Similarly, dragging the adjust scheduled end control to the left (toward from the center of the UI element) will make the scheduled end earlier, while dragging it to the right (away from the center of the UI element) will make the scheduled end later. The specific scheduled start and end dates currently selected are, in this example, displayed by the scheduled start date and scheduled end date labels 506 and 508 respectively.

When the CA 114 detects interaction that changes a scheduled start or end date (e.g. by dragging control 502 or 504 and releasing it in a differing position), the CA 114 causes the modified date to be saved. In the present, client-server architecture, the CA 114 generates a work item update capturing the changed data and communicates this to the CS 104 (which can then save the change to the data storage system 108). The work item update can include, for example: the ID of the work item the UI element 402 corresponds to; a user ID of the user making the change; a time stamp; the new scheduled start or end date.

As will be appreciated, adjusting the scheduled start and not the scheduled end of a work item (or vice versa) effectively changes the duration of the work item—i.e. the time allowed for its completion.

In the example of FIG. 5, UI element 402 is intended to be displayed on a timeline interface in which earlier times are to the left and later times are to the right (e.g. as in interface 320 above). In this context, the create dependency controls 510 are displayed at opposite ends of the UI element: specifically, the create blocked-by dependency control 510a is displayed proximate the left end of the UI element 402, and the create blocking dependency control 510b is displayed proximate the right end of the UI element 402. More generally, in certain embodiments the create blocked-by dependency control 510a is displayed more proximate to the left end of the UI element than create blocking dependency control 510b.

Figure 6:
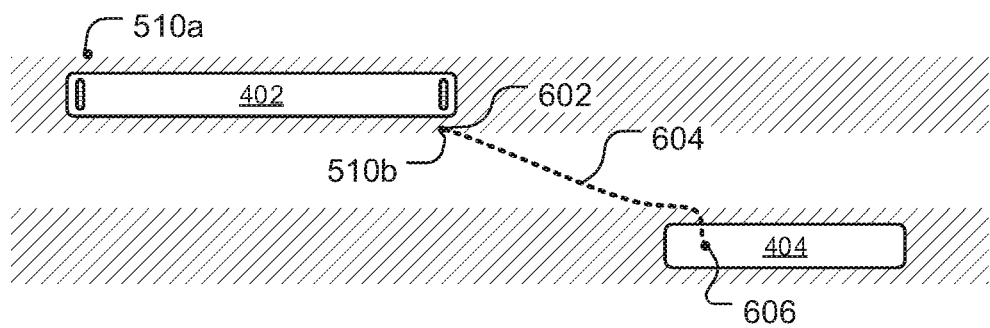
FIG. 6 depicts a user interaction to create a dependency between two work items.

As depicted in FIG. 6, the create dependency controls 510 can be interacted with to create a dependency between issues. Such interaction will be referred to as a create dependency user interaction. For example, the CA 114 can be configured to detect a create dependency user interaction comprising a first interaction component that selects a create dependency control 318 of a first work item UI element (in this case UI element 402), a second interaction component that traces a path to a position at or near a second work item user interface element (in this case UI element 404) and selects the second work item UI element. Selection of the second work item UI element may be part of the second interaction component (e.g. occurring automatically on the path reaching the second work item UI element or a specific portion thereof) or may involve a third interaction component.

For example, where control is via a pointing device such as a mouse, the first interaction component may be activating a button of the pointing device button while the cursor is over or proximate the create dependency control 318, the second interaction component may be moving the mouse pointer to or near to the second work item UI element 404. Selection of the second work item UI element 404 may automatically occur on the pointer reaching a particular position with respect to the second work item UI element 404. Alternatively, selection of the second work item UI element 404 may require a third interaction component such as releasing the button while the cursor is over or proximate the second work item UI element 404.

As a further example, where control is via a touch sensitive display, the first interaction component may be contacting the display at or near a location the create dependency control 318 is displayed, the second interaction component may be dragging the contact (without releasing it) to or near to a position the second work item UI element 404 is displayed. Again, selection of the second work item UI element 404 may automatically occur on the contact reaching a particular position with respect to the second work item UI element 404. Alternatively, selection of the second work item UI element 404 may require a third interaction component such as releasing the contact while it is at or proximate the second work item UI element 404.

FIG. 6 depicts this interaction: 602 indicating the first interaction component (selecting control 510b), broken line 604 indicating the second interaction component—e.g. a path traced by a pointing device or contact with a touch sensitive display, and 606 indicating the third interaction component (e.g. selecting work item UI element 404).

In response to detecting a create dependency user interaction, the CA 114 creates a dependency relationship between the work items corresponding to the work item user interface elements involved in the interaction (in this example elements 402 and 404).

In order to determine the roles of the work items involved in the newly created dependency relationship (i.e. which work item is the outgoing work item and which is the incoming work item) the CA 114 determines which create dependency control 510 was interacted with.

If the user interaction was with the create blocking dependency control 510b of the first work item UI element, the CA 114 determines that the first work item blocks the second work item: i.e. the first work item is the incoming work item the second work item is the outgoing work item. This is the situation in the examples of FIGS. 4B and 4C. Conversely, if the user interaction was with the create blocked-by dependency control 510a of the first work item UI element, the CA 114 determines that the first work item is blocked by (or dependent on) the second work item: i.e. the first work item is the outgoing work item and the second work item is the incoming work item.

Figure 7:
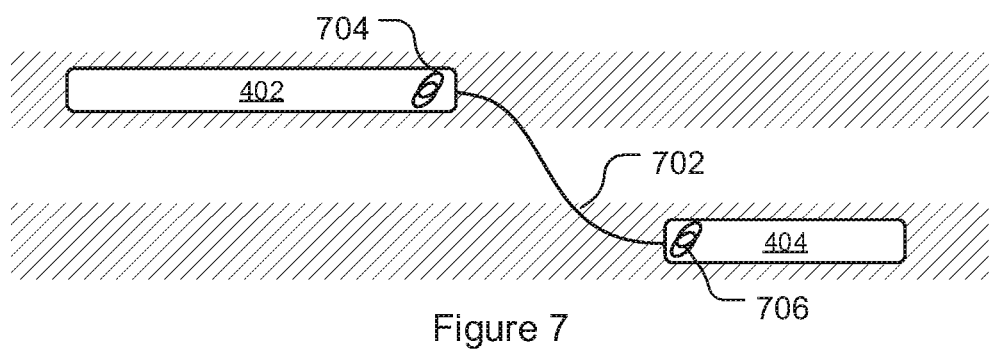
FIG. 7 depicts two work items in a non-broken dependency relationship.

In addition, the CA 114 updates the user interface to provide one or more visual representations of the dependency. An example of this is depicted in FIG. 7. FIG. 7 includes a dependency path 702 displayed between work item user interface elements 402 and 404. The example of FIG. 7 also includes a pair of linked work item indicators 704 and 706, one displayed on each of work item user interface elements 402 and 404.

In the context of a timeline interface with time on the horizontal axis and earlier times to the left of later times, dependency path 702 indicates that the dependency it represents is not broken: the work item corresponding to UI element 404 depends on the work item corresponding to UI element 402, and the work item corresponding to UI element 402 has a scheduled end before the scheduled start of the work item corresponding to UI element 404.

The CA 114 can be configured to adjust appearance attributes of the dependency path 702 in various ways depending on the dependency and work items in question.

One appearance attribute of a dependency path that can be adjusted is where the dependency path extends out of the work item UI elements. For example, in the context of a timeline running left to right, FIG. 7 shows dependency path 702 extending from the right end of work item UI element 402 and from the left end of work item UI element 404. In contrast, FIG. 8 (discussed below) shows dependency path 802 extending from the left end of work item UI element 402 and from the right end of work item UI element 404.

Generally speaking, the CA 114 is configured to display the dependency path so that for the incoming work item the path extends from a side of the incoming work item's UI element that corresponds to a later time (e.g. the right side in a timeline running from left to right). For the outgoing work item the CA 114 displays the path to extend from the side of the outgoing work item's UI element corresponding to an earlier time (e.g. the left side in a timeline running from left to right).

Displaying dependency paths in this way provides an intuitive visual indication as to which work item is the incoming and which is the outgoing.

As can be seen, the additional user interface controls for work item UI element 402 that are shown in FIG. 6 are not displayed in FIG. 7. In the present embodiment, the CA 114 is configured to hide these controls once a dependency has been created (and/or the user interaction causing the controls to be displayed is no longer detected).

Additional or alternative mechanisms can be used to indicate the direction of a given dependency. For example, dependency paths can be displayed with an arrow: a dependency path pointing from a first work item UI element to a second work item UI element indicating the work item corresponding to the second work item UI element is dependent on/blocked by the work item corresponding to the first work item UI element.

Figure 8:
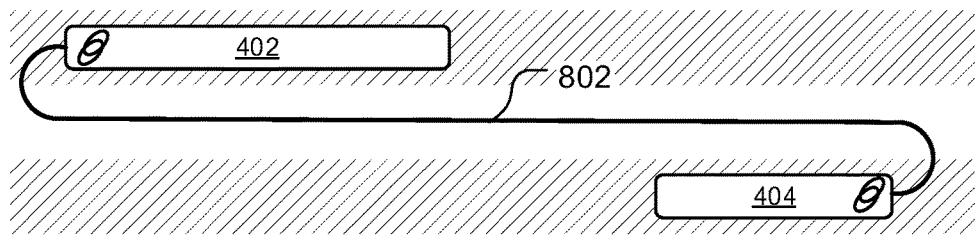
FIG. 8 depicts two work items in a schedule-broken dependency relationship.

FIG. 8 provide an example of an alternative user interface generated by the CA 114 in response to detecting user interaction in which the create blocked by control of work item UI element 402 is selected and dragged to work item UI element 404. In this case the CA 114 determines that the first work item (corresponding to UI element 402) is blocked by the second work item (corresponding to UI element 404) and displays the dependency path 802 so that it extends from the left side of UI element 402 and the right side of UI element 404.

In the context of a timeline interface with time on the horizontal axis and earlier times to the left of later times, dependency path 802 also indicates that the dependency it represents is broken (scheduled-broken): the work item corresponding to UI element 402 depends on the work item corresponding to UI element 404, but the work item corresponding to UI element 402 has a scheduled start before the scheduled end of the work item corresponding to UI element 404.

In certain embodiments, the CA 114 is configured to visually distinguish dependency paths that represent broken dependencies over dependency paths that represent non-broken dependencies. Various techniques may be used to achieve this visual distinction, for example one or more of: path color (e.g. reserving a particular color—such as red—for paths representing broken dependencies); path line weight; a path line style (e.g. broken lines, dot-dash lines, a line made up of alternative line elements); visual features on a path (e.g. an 'x' or similar displayed on the path). Furthermore, and as discussed below, where forecasts are calculated the CA 114 can also be configured to further distinguish scheduled-broken from forecast-broken (and non-broken) dependencies.

Figure 9:
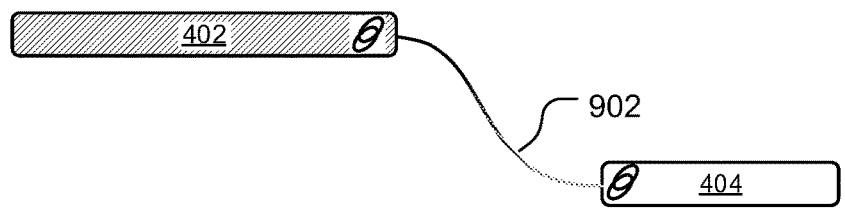
FIG. 9 depicts two work items in a dependency relationship.

As described above, in certain embodiments, the CA 114 is configured to display work item UI elements in a manner that allows the assignees thereof to be distinguished. In this case the CA 114 may be configured to base the appearance of dependency paths on the appearance of the associated work item UI elements. FIG. 9 provides an example of this. In FIG. 9, work item UI has a first visual appearance (in this case a black fill) and work item UI has a second visual appearance (in this case a light grey fill). This indicates that the work items corresponding to UI elements 402 and 404 are assigned to different resources. Based on the appearance of the work item UI elements 402 and 404, the dependency path 902 is shown with a gradient combining those appearances. Specifically, a first portion of the path that is proximate the first work item UI element is based on an appearance of the first work item UI element (in this case black), a second portion of the path that is proximate the second work item UI element is based on an appearance of the second work item UI element (in this case light grey), and a third portion of the path that is between the first and second portions transitions between the appearances of the first and second portions (in this case a black to light grey gradient).

In certain embodiments, CA 114 is configured to detect a display dependency information user interaction and, in response, display dependency information.

Figure 10:
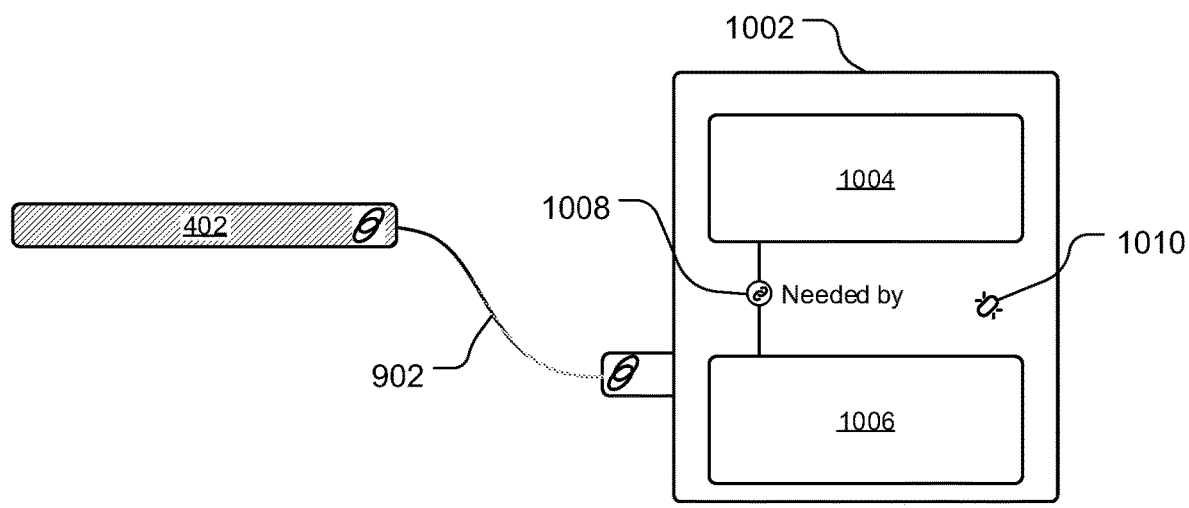
FIG. 10 depicts a dependency information pane.

The CA may be configured to detect a display dependency information user interaction in relation to a dependency path (e.g. hovering, dwelling, contacting, clicking on, or otherwise interacting with the dependency path). In this case, the CA 114 may be configured to display a dependency information pane such as pane 1002 of FIG. 10. Dependency information pane 1002 includes an incoming work item information pane 1004, an outgoing work item information page 1006, dependency indicator 1008, and a delete dependency control 1010.

CA 114 populates the incoming and outgoing work item information panes 1004 and 1006 with information on the incoming and outgoing work items the dependency relates to respectively. In this particular example, the incoming work item is the work item associated with work item UI element 402 and the outgoing work item is the work item associated with work item UI element 404. The CA 114 can be configured to retrieve and display various information in respect of the incoming/outgoing work items in the incoming/outgoing work item information panes 1004/1006. This information can include, for example, one or more of: the work item identifier; the work item type; the creator ID; the date created; the work item title; the work item description; the scheduled start; the scheduled end; the assignee identifier (or name associated therewith); the actual start (if started); actual end (if finished).

The CA 114 can, for example, retrieve the work item information to be displayed in the incoming and outgoing work item information panes 1004 and 1006 by requesting the information from the SA 104 using the incoming and outgoing work item identifiers associated with the dependency.

The dependency indicator 1008 provides a visual indication of the dependency relationship between the work items. In this example, dependency indicator 1008 includes a line joining the work information panes 1004 and 1006 (the line including link graphic). In this example the dependency information also includes a description of the dependency—specifically, in this case, the words 'needed by' indicating that the work item described in information pane 1004 is needed by the work item described in information pane 1006.

If CA 114 detects activation of the delete dependency control 1010 it deletes the dependency described by the dependency information pane—for example by generating and communicating a delete dependency message to the CS 104.

The CA may also, or alternatively, be configured to detect a display dependency information user interaction in relation to a work item UI element (e.g. hovering, dwelling, contacting, clicking on, or otherwise interacting with a work item UI element or part thereof). In this case, the CA 114 may be configured to display a dependency information pane which provides information on all dependencies the work item corresponding to the work item UI element that has been interacted with is involved in. One example of such a dependency information pane is described below with respect to FIG. 19.

Dependency Creation Process

This section describes a computer implemented method for creating and displaying a dependency between two work items.

Figure 11:
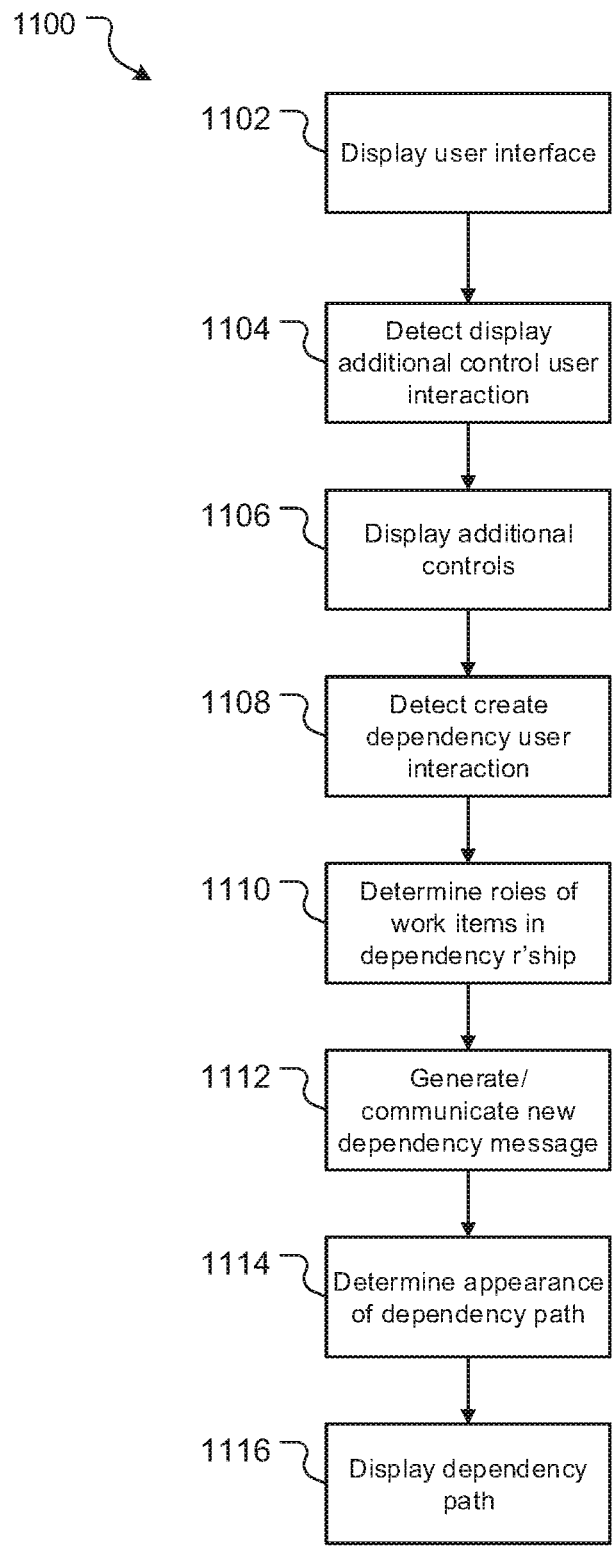
FIG. 11 is a flowchart depicting operations involved in creating a dependency relationship between two work items.

The dependency creation process 1100 will be described with reference to the flowchart of FIG. 11 which illustrates processing performed by a computer processing system. In the present implementation, these processing steps are performed by the CA 114 running on a user computer 112.

At 1102, the CA 114 displays a user interface (e.g. 300) which includes at least first and second work item user interface elements (e.g. 402 and 404).

At 1104, the CA 114 detects a display additional controls user interaction with (or in respect of) a first work item UI element.

At 1106, in response to detecting the display additional control user interaction, the CA 114 displays additional controls associated with the first work item UI element. The additional controls include a create blocked-by dependency control (e.g. 1110a) and a create blocking dependency control (e.g. 1110b).

In certain embodiments the CA 114 may display create dependency controls as a 'normal' part of a given work item UI element. In this case operations 1104 and 1106 are omitted.

At 1108, the CA 114 detects a create dependency user interaction. By way of example, the create dependency user interaction may comprise a first input selecting one of the create blocked-by control or create blocking dependency control and a second input dragging from the selected control to or near to the second work item UI element. In certain implementations, selection of the second work item UI element may automatically occur on the drag input reaching a particular position with respect to the second work item UI element. Alternatively, selection of the second work item UI element 404 may require a third interaction component such as releasing a button or contact while over or proximate the second work item UI element 404.

At 1110, in response to detecting a create dependency user interaction, the CA 114 determines the roles of the work items involved in the dependency relationship. In the present embodiment, and as described above, this involves determining which create dependency control (e.g. 1110) the user interaction detected at 1108 was in respect of.

If the user interaction was with the create blocking dependency control (e.g. 1110b) of the first work item UI element, the CA 114 determines that the first work item is the incoming work item and the second work item is the outgoing work item. Conversely, if the user interaction was with the create blocked-by dependency control (e.g. 1110a) of the first work item UI element, the CA 114 determines that the first work item is the outgoing work item and the second work item is the incoming work item.

At 1112, the CA 114 causes the newly created dependency to be saved. This could, however, be performed at an alternative time. In the present, client-server architecture, to save the dependency the CA 114 generates a new dependency message (or messages) capturing information in respect of the new dependency and communicates the message(s) to the CS 104 (which can then save the new dependency to the data storage system 108). Continuing with the example dependency data structure described above, the new dependency message(s) can include an incoming work item identifier (identifying the incoming work item), an outgoing work item identifier (identifying the outgoing work item), a creator identifier identifying the creator of the dependency, and a creation date indicating the date the dependency was created.

At 1114, the CA determine an appearance of a dependency path that will be displayed. As described above (and per the further examples below), the CA can be configured to determine appearance attributes of the dependency path.

As discussed above, two appearance attributes of the dependency path are where the path extends out of the two work item UI elements. In the present implementation, the CA 114 is configured to display the dependency path so that: for the incoming work item the path extends from a side of the UI element corresponding to a later time (e.g. the right side in a timeline running from left to right); for the outgoing work item the path extends from the opposite side of the UI element—i.e. the side corresponding to an earlier time (e.g. the left side in a timeline running from left to right).

As also discussed above, another factor that may influence the appearance of a dependency path is if the dependency is scheduled-broken. In implementations that do this, the CA 114 determines whether the dependency is scheduled-broken and, if so, determines that the dependency path should be shown as a scheduled-broken dependency. In order to determine if a dependency is scheduled-broken the CA 114 compares the scheduled end of the incoming work item to the scheduled start of the outgoing work item. If the CA 114 does not already have this data it can request it from the SA 104 using the work item identifiers of the incoming/outgoing work items. If the scheduled end of the incoming work item is the same or earlier than the scheduled start of the outgoing work item the CA 114 determines the dependency is not scheduled-broken. Conversely, if the scheduled end of the incoming work item is later than the scheduled start of the outgoing work item the CA 114 determines the dependency is scheduled-broken.

If the scheduled end of the incoming work item is the same as the scheduled start of the outgoing work item the CA 114 will typically be configured to determine the dependency as scheduled-broken, but could alternatively be configured to determine it as not broken (and, potentially, display or otherwise output a warning that one task is scheduled to start on the same day the task it is dependent on is scheduled to end).

As also discussed above, the CA 114 may be configured to determine the appearance of the dependency path based the appearance of the associated work item UI elements. In this case the CA 114 determines the appearances of work-item UI elements involved in the relationship (which, as noted, may be based on the resources those work items are assigned to) and generate a dependency path with a gradient appearance. This may be, for example, a path that has: a first portion proximate the outgoing work item's UI element and that has first visual properties based on visual properties of the outgoing work item's UI element; a second portion proximate the incoming work item's UI element and that has second visual properties based on visual properties of the incoming work item's UI element; and a third portion between the first and second portion that transitions from the first visual properties to the second visual properties (e.g. via a gradient or other mechanism).

Where the CA 114 displays broken dependencies in a particular manner and the broken dependency path appearance cannot co-exist with a path appearance based on the appearances of the work items, the broken dependency path appearance takes precedence. For example, if the CA is configured to display a red path for broken dependencies and a path that is made up of colors of the associated work items, the CA 114 will be configured to prevent work items from having the red color used for broken dependencies and, in the event a broke dependency is detected, show that dependency as red (and not a combination of the colors of the associated work items).

In some implementations, the CA 114 may be configured to display all dependency paths in the same manner (for example a path between the two work item UI elements of a set color/weight etc.). In this case operation 1114 can be omitted.

At 1116, the CA 114 displays the dependency path with the appearance determined at 1114.

Dependency Update Process

This section describes a computer implemented method for updating a dependency between two work items.

Figure 12:
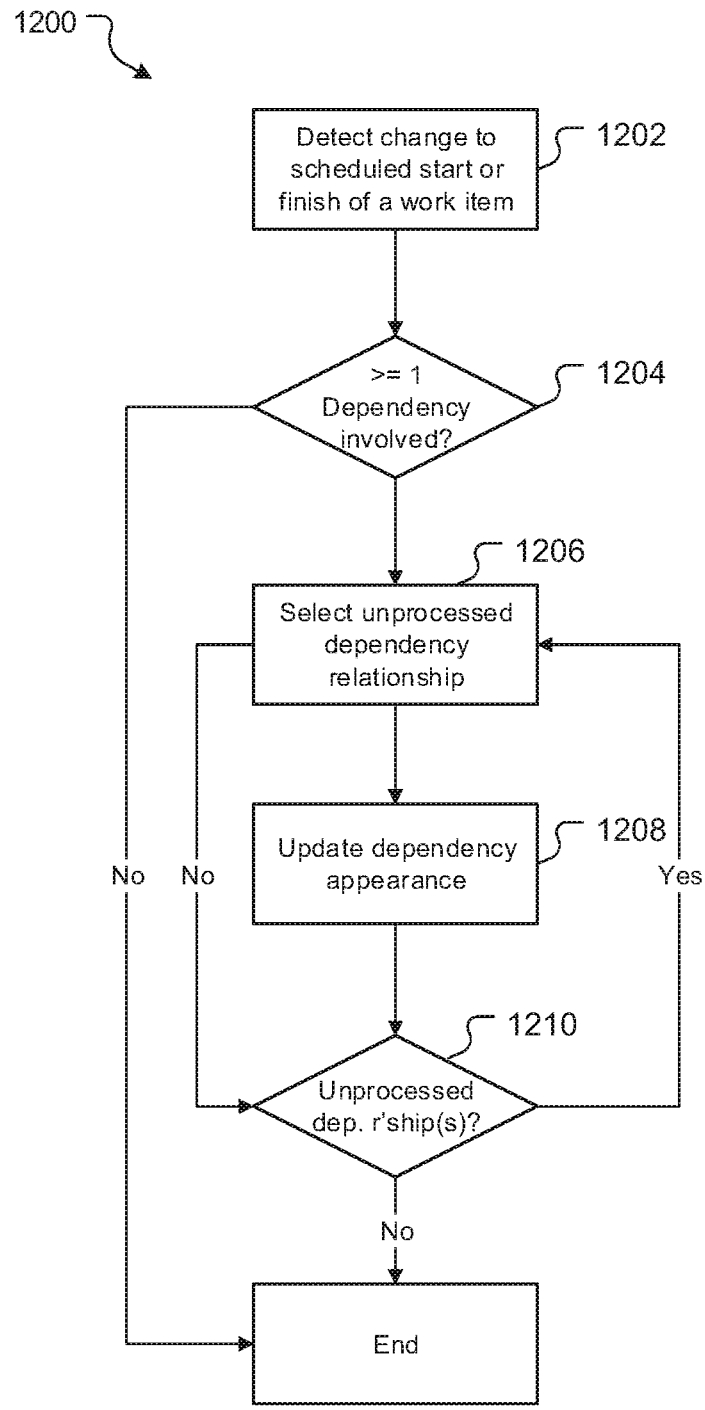
FIG. 12 is a flowchart depicting operations involved in updating a dependency relationship.

The dependency update process 1100 will be described with reference to the flowchart of FIG. 12, which illustrates processing performed by a computer processing system. In the present implementation, these processing steps are performed by the CA 114 running on a user computer 112.

At 1202, the CA 114 detects user interaction causing the scheduled start and/or end of a particular work item to change. Various examples of interactions causing such a change are described above. For example, a user may: drag a work item UI element along its row causing the corresponding work item's scheduled start and end to change; interact with an adjust scheduled start control (such as 502) causing the scheduled start of the corresponding work item to change; interact with an adjust scheduled end control (such as 504) causing the scheduled end of the corresponding work item to change. Additional interactions to change the scheduled start and/or end or a work item are possible.

At 1204, the CA 114 determines whether the particular work item is involved in any dependency relationships. If not, the current process end. If so, processing proceeds to 1206.

At 1206, the CA 114 selects a dependency relationship that the particular work item is involved in and that has not yet been processed. Dependency relationships the particular work item is involved in may be selected for processing in any order.

At 1208, the CA 114 updates the appearance of the selected dependency relationship in the user interface.

If the CA 114 determines the change to the scheduled start/finish of the particular work item results in a scheduled-broken dependency it updates the displayed dependency path to reflect this (as described above). In this case the CA 114 may be configured to also display an alert (e.g. a pop-up text box, information pane, or other alert) indicating to the user that the changes have resulted in a scheduled-broken dependency.

If the CA 114 determines the change to the scheduled start/finish of the particular work item changes a dependency from a broken dependency to a non-broken dependency it updates the displayed dependency path to reflect this (as described above).

If the dependency was initially broken and remains broken, or was initially not broken and remains not broken, no update to the appearance of the dependency path (aside from reflecting new start and end points) may be necessary.

If the particular work item is the incoming work item in the selected dependency relationship, determining whether the change to the scheduled start/finish results in a schedule-broken dependency relationship involves determining whether the scheduled end of the particular work item (as changed if it has been changed) is before the scheduled start of the outgoing work item of the selected dependency relationship. If so, the CA 114 determines the selected dependency relationship to be schedule-broken. If not, the CA 114 determines the selected dependency relationship to be not broken.

If the particular work item is the outgoing work item in the selected dependency relationship, determining whether the selected dependency relationship is scheduled-broken involves determining whether the scheduled start of the particular work item (as changed if it has been changed) is earlier than the scheduled end of the incoming work item of the selected dependency relationship. If so, the CA 114 determines the selected dependency relationship to be schedule-broken. If not, the CA 114 determines the selected dependency relationship to be not broken.

Where forecasts have been calculated and displayed (as discussed below), updating the dependency appearance 1208 can also involve consideration of forecast start/end dates (or start/end date ranges). In this case, when a change to a scheduled start or finish of a work item is detected the CA 114 recalculates forecast dates (or date ranges). Depending on the changes made, recalculating forecast dates may involve requesting new forecast data for the work item(s) in question (as described below with reference to FIG. 24). Alternatively, the CA 114 may be able to recalculate forecast dates (or date ranges) based on forecast data already received for the work items in question—for example if the duration of a work item has not changed, in which case it may be possible to simply shift the forecast start/end date (or range) by the same amount of time the scheduled start/end has been shifted.

As with the detection of schedule-broken dependencies, if the CA 114 determines the change to the scheduled start/finish of the particular work item results in a forecast-broken dependency it updates the displayed dependency path to reflect this (as described below) and/or display an alert.

At 1210, the CA 114 determines whether there are any dependency relationships the particular work item is involved in that have not been processed. If so, processing returns to 1206. If not, process 1200 ends.

Further Dependency Examples

This section, and the associated Figures, provide further examples of user interfaces and user interface elements/features that build on those described above.

Figure 13:
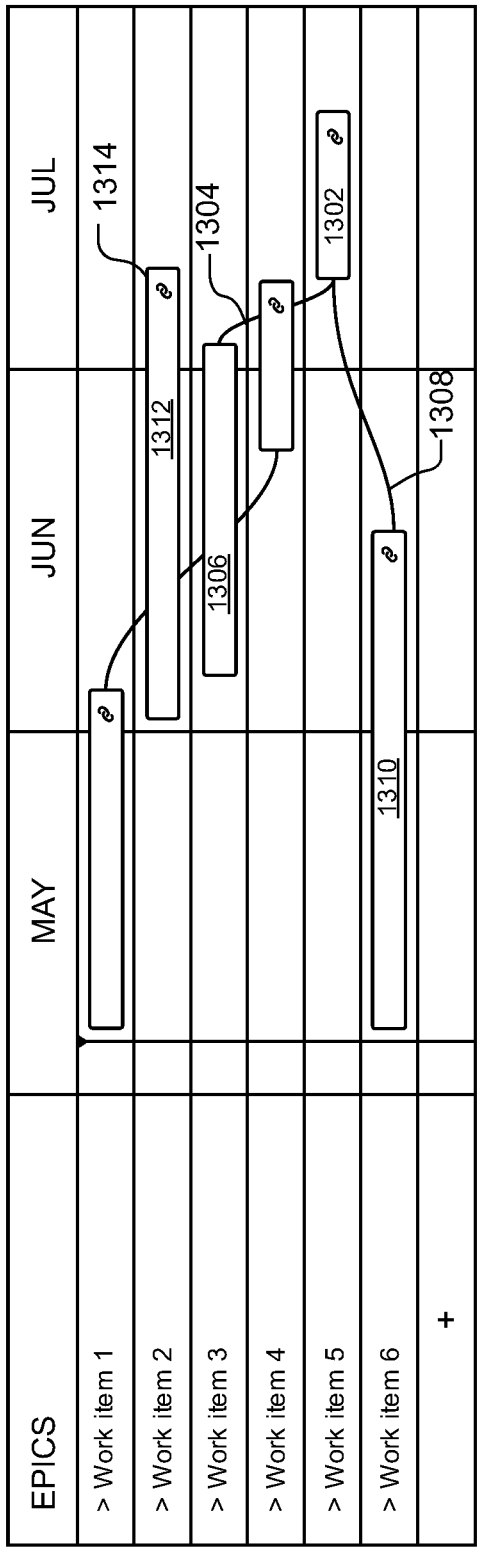
FIG. 13 depicts an example user interface.

FIG. 13 depicts a timeline interface in which the work item corresponding to work item UI element 1302 is the outgoing work item in two dependency relationships: one, 1304, with the work item corresponding to work item UI element 1306; one, 1308, with the work item corresponding to work item UI element 1310. This indicates that the work items corresponding to UI elements 1306 and 1310 must both be completed before the work item corresponding to UI element 1302 can commence.

Furthermore, work item UI element 1312 includes a linked work item indicator 1314 indicating that the corresponding work item is involved in a dependency relationship. No dependency path extending from work item UI element 1312 is, however, displayed. This may indicate that the other work item in the dependency relationship is in another project. It could alternatively be the result of the other work item not being displayed, for example due to an active filter causing it not to be shown. In this case a user can interact with the linked work item indicator 1314 to cause the CA 114 to display further information in respect of the dependency (for example in a dependency information pane such as 1002 described above).

FIG. 14 depicts a timeline interface in which the work item corresponding to work item UI element 1402 is the incoming work item in two dependency relationships: one, 1404, with the work item corresponding to work item UI element 1406; one, 1408, with the work item corresponding to work item UI element 1410. This indicates that the neither of the work items corresponding to UI elements 1406 and 1410 can be commenced until the work item corresponding to UI element 1402 is complete.

FIG. 15 depicts the timeline interface of FIG. 14 following user interaction with work item UI element 1406 to change its scheduled start/end (e.g. by dragging UI element 1406 to the left). In doing so, the user has broken dependency 1404 (due to dragging the UI element 1406 to a position where its corresponding work item has a scheduled start that is earlier than the scheduled end of the work item corresponding to UI element 1402. In response to this interaction, the CA 114 has adjusted the dependency path 1404 between the two work item UI elements 1402 and 1404 in accordance with the new scheduled start/end, and has also modified the appearance of the dependency path 1404 to show that it represents a schedule-broken dependency (e.g. by changing the color of the dependency path from grey to red or otherwise modifying its appearance to indicate a schedule-broken dependency).

Figure 16:
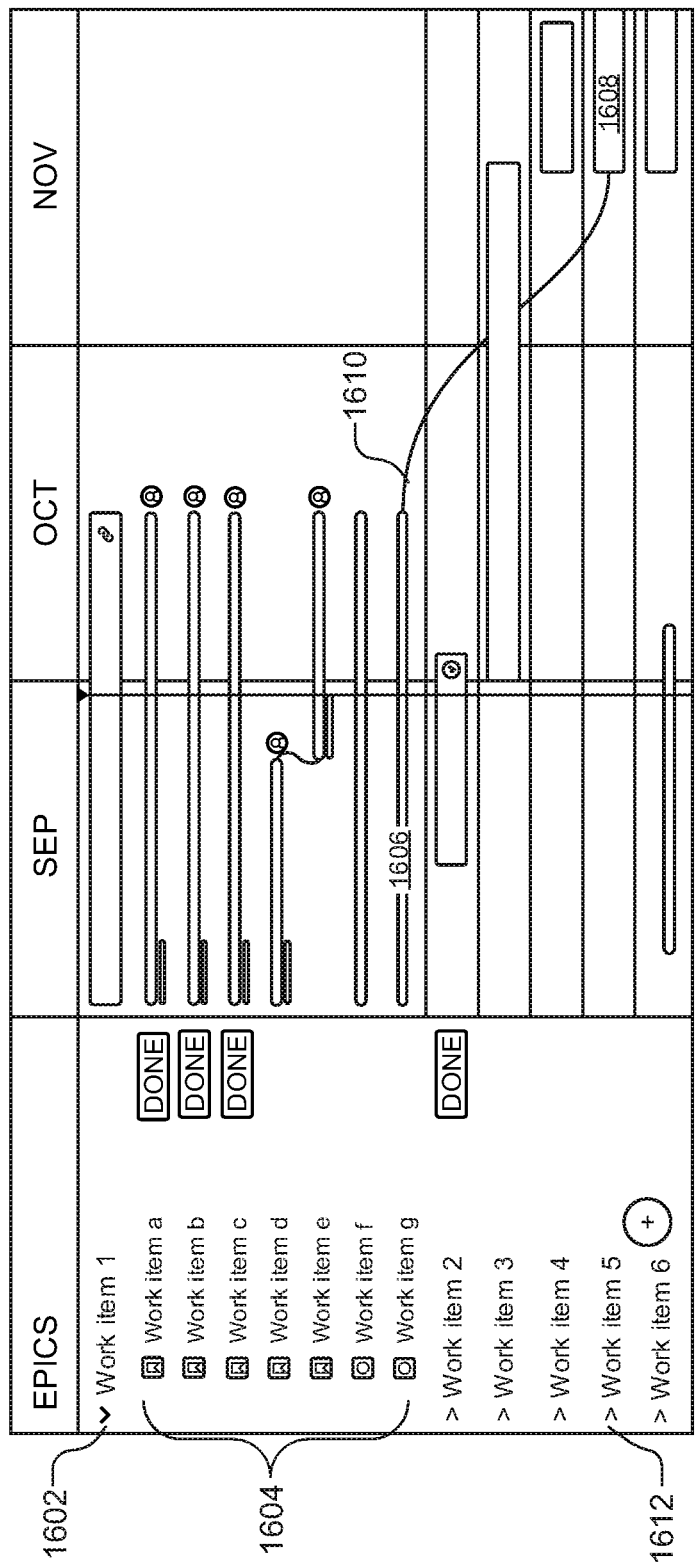
FIG. 16 depicts an example user interface.

FIG. 16 depicts an interface in which shows two types of work items: in this case epics and stories. To do so, the CA 114 is configured to provide the row labels (which in this case represent epics) as UI elements that, when interacted with (e.g. by clicking or contacting) expand to show associated sub-level work items (in this case stories).

In FIG. 16, row label 1602 (related to the epic with title "NextGen Front-end") has been activated to expand and show its component stories 1604 (e.g. Contextual Menu Sections, GSA Requirements, etc.). Each component story is provided with its own row in the timeline interface. Furthermore, the stories (sub-work items) are visually distinguished from their parent epic (the parent work item)—in this case via row label indentation.

FIG. 16 also provides an example of a sub-work item of a parent work item being involved in a dependency relationship with a different parent work item. E.g. story 1606 (with title 'loading Bug in Safari') is a sub-work item of epic 1602, but is in a dependency relationship with epic 1608 (with label 'Third Party Service). This may indicate that story 1606 is in a direct relationship with epic 1608 or that story 1606 is in a relationship with one or more stories of epic 1608. This would become apparent if a user caused additional dependency information to be shown (e.g. in a dependency information pane—e.g. by activating dependency path 1610), or expanded epic 1608 to show its stories (e.g. by selection of the epic's title/carat 1612 in the row label).

Figure 17:
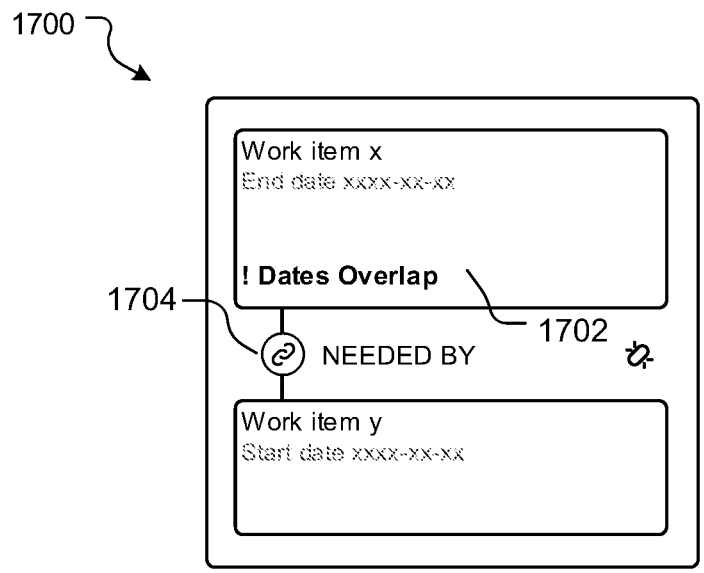
FIG. 17 depicts an example dependency information pane.

FIG. 17 provides a further example of a dependency information pane 1700 (similar to pane 1002 described above). Dependency information pane 1700 relates to a schedule-broken dependency and includes an indicator 1702 that the dependency is schedule-broken (in this case a warning icon and 'Dates overlap' text). The dependency indicator 1704 may also be provided with an appearance indicating it is schedule-broken, for example by being displayed in a particular color (e.g. red) that is different to the color non-broken dependencies (and/or forecast-broken dependencies) are displayed in.

Figure 18:
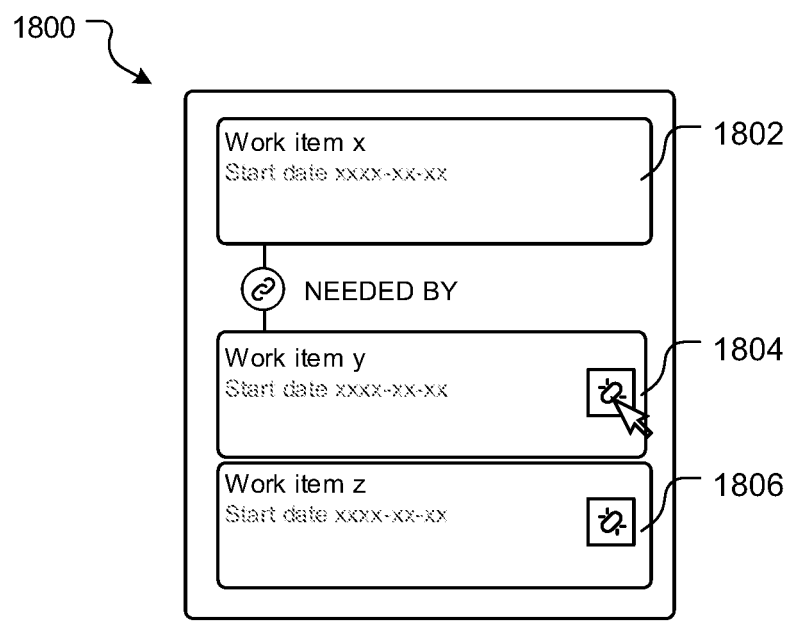
FIG. 18 depicts an example dependency information pane.

FIG. 18 provides another example of a dependency information pane 1800. Dependency information pane 1800 includes a single incoming work item information pane 1802 and two outgoing work item information panes 1804 and 1806. This indicates that the work item associated with incoming work item information pane 1802 is the incoming work item for two separate dependency relationship: one with the work item associated with outgoing work item information pane 1804 and one with the work item associated with outgoing work item information pane 1806. Dependency information pane 1800 is displayed as the result of user interaction with a work item UI element (rather than a dependency path)—specifically the work item UI element corresponding to the 'third party service' work item (information on which is displayed in pane 1802).

Figure 19:
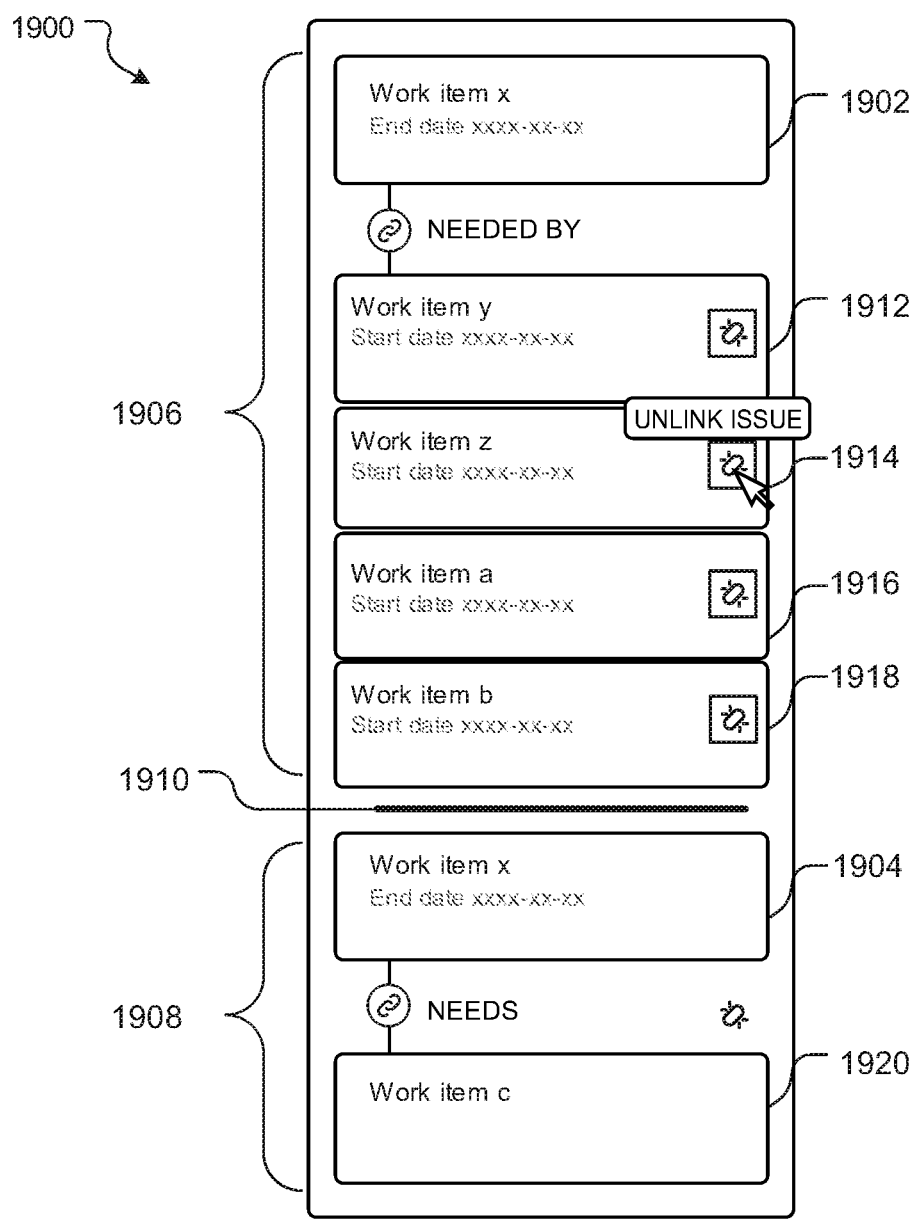
FIG. 19 depicts an example dependency information pane.

FIG. 19 provides a further example of a dependency information pane 1900. Dependency information pane 1900 shows both incoming and outgoing dependencies of a particular work item (the work item associated with outgoing work item information pane 1902 and incoming work item information pane 1904, both of which are associated with the same work item). In this example, dependency information pane 1900 includes two sections 1906 and 1908, divided by a visual separator 1910 (in this case a horizontal line).

Section 1906 shows dependency relationships in which the particular work item is the outgoing work item. In this example, the particular work item is the outgoing work item in four dependency relationships—one with each of the work items associated with incoming work item information panes 1912, 1914, 1916, and 1918.

Section 1908 shows dependency relationships in which the particular work item is the incoming work item. In this example, the particular work item is the incoming work item in a single dependency relationship with the work item associated with outgoing work item information pane 1920.

Dependency information pane 1900 is displayed as the result of user interaction with a work item UI element (rather than a dependency path)—specifically the work item UI element corresponding to the 'next-gen font end' work item (information on which is displayed in panes 1902 and 1904).

Work Item Forecasting

This section describes additional features related to work item forecasts.

Generally speaking, this section is divided into two parts: user interface features for displaying forecast data and the generation of forecast data.

The generation of forecast data is described below. Depending on implementation, forecast data may defines (or allow calculation of) at least one of the following for a given work item: one or more forecast durations; one or more forecast start date ranges; a forecast start date; one or more forecast end date ranges; a forecast end date.

A given forecast start date range is defined by an earlier forecast start date and a later forecast start date. A forecast start date range may be associated with a given confidence interval, and where multiple forecast start date ranges are defined (or can be calculated), each forecast start date range may be associated with a different confidence interval. For example, the forecast data for a given work item may define (or allow calculation of) a first start date range associated with an 80% confidence interval and having an earlier date of 1 Jan. 2020 and a later date of 3 Jan. 2020. The forecast data for the work item may also define (or allow calculation of) a second start date range associated with a 90% confidence interval and having an earlier date of 29 Dec. 2019 and a later date of 5 Jan. 2020. Additional (or alternative) start date ranges associated with alternative confidence intervals are also possible.

Similarly, a given forecast end date range is defined by an earlier forecast end date and a later forecast end date. A forecast end date range may be associated with a given confidence interval, and where multiple forecast end date ranges are defined (or can be calculated), each forecast end date range may be associated with a different confidence interval. For example, the forecast data for a given work item may define (or allow calculation of) a first end date range associated with an 80% confidence interval and having an earlier date of 25 Mar. 2020 and a later date of 26 Mar. 2020. The forecast data for the work item may also define (or allow calculation of) a second end date range associated with a 90% confidence interval and having an earlier date of 20 Mar. 2020 and a later date of 30 Mar. 2020. Additional (or alternative) end date ranges associated with alternative confidence intervals are also possible.

A forecast start date may also (or alternatively) be defined by/calculable from the forecast data. This could, for example, be a date in the forecast start date range having the highest confidence interval, a date in the middle of the forecast start date range, or an alternatively defined/calculated date.

A forecast end date may also (or alternatively) be defined by/calculable from the forecast data. This could, for example, be a date in the forecast end date range having the highest confidence interval, a date in the middle of the forecast end date range, or an alternatively defined/calculated date.

Initially, user interface features relevant to work item forecasts will be described followed by examples of forecast data generation.

Work Item Forecast User Interface Features

Figure 20A:
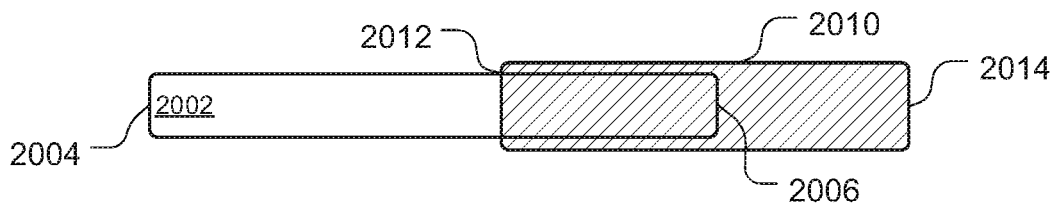
FIGS. 20A to 20F depict example work item user interface elements with associated forecast user interface elements.

FIG. 20A shows a work item UI element 2002 which is associated with a forecast UI element 2010.

As with work item UI elements discussed above, work item UI element 2002 is a bar. When the work item UI element 2002 is displayed on a timeline interface (such as 320): a first (in this case left) end 2004 indicates a scheduled start date of the associated work item and the second, opposite end 2006 (in this case right end) indicates a scheduled end date.

In the present example, forecast UI element 2010 represents a forecast end date range and also has a bar-type appearance. When the forecast UI element 2010 is displayed on the timeline interface: a first (in this case left) end 2012 indicates an earlier forecast end date and the second, opposite end 2014 (in this case right end) indicates a later forecast end date.

The forecast UI element 2010 is visually distinguished from the associated work item UI element 2002. This can be achieved in various ways—for example by use of one or more different visual attributes of the work item UI element 2002 and forecast UI element 2010. By way of example, visual attributes that can be used to distinguish may appearance include: fill colors; fill patterns; shadow effects; line weights; line types; line colors; text; UI element depth (e.g. one element overlaying another); UI element spatial positioning; any other appropriate visual attribute.

Furthermore, in the present implementation, display of the forecast UI element 2010 does not prevent detail provided by the associated work item UI element 2002 (for example the scheduled start and end dates represented thereby) from being seen. This can be achieved in various ways. For example, in FIG. 20A the forecast UI element 2010 is displayed atop the work item UI element 2002 but with a degree of transparency to allow the work item UI element 2002 to be seen through it. This could be reversed with the work item UI element 2002 displayed with transparency atop the forecast UI element 2010.

Figure 20B:
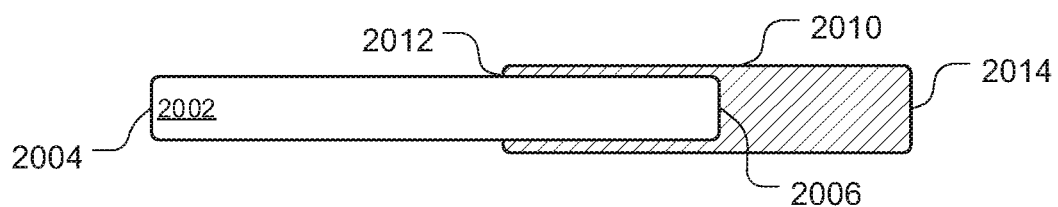

Alternatively, as shown in In FIG. 20B, the forecast UI element 2010 is displayed behind the work item UI element 2002 but is shaped so that relevant parts of the forecast UI element 2010 (in this particular example the first end 2012) are visible or partly visible outside the boundary of the work item UI element 2002.

Figure 20C:
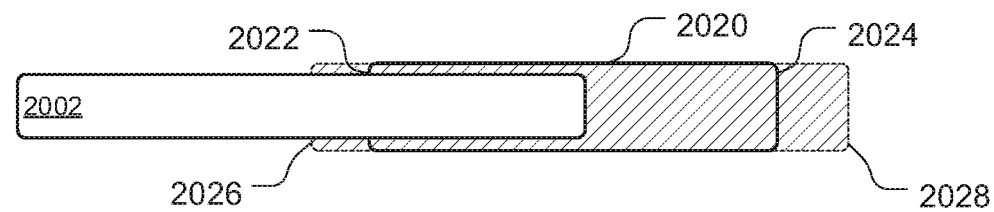

As noted above, in certain embodiments a forecast for a given work item may define (or allow calculation of) more than one forecast start or end date range. FIG. 20C illustrates a forecast UI element 2020 showing two end date ranges. The first end date range has a first end 2022 (in this case left) indicating the start of the first end date range and a second end 2024 (in this case right) indicating the end of the first end date range. The second end date range has a first end 2026 (in this case left) indicating the start of the second end date range and a second end 2028 (in this case right) indicating the end of the second end date range.

Relevantly, the second date range (or, at least, the end-points thereof) is visually distinguished from the first date range (And from the associated work item UI element 2002). In FIG. 20C, the second date range is distinguished by use of a broken line. Once again, however, alternative means of visually distinguishing the date ranges (for example as described above) are possible.

Figure 20D:
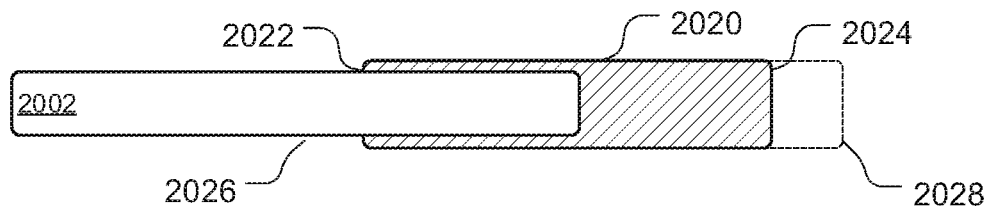

FIG. 20D provides a further example of a forecast UI element defining two date ranges. In this case, however, only one end of the second date range is displayed. As forecast UI element 2020 indicates a forecast end date range only the second end 2028—representing the later date of the second end date range—is displayed (on the basis that a user will most likely be interested in the latest forecast end date).

Figure 20E:
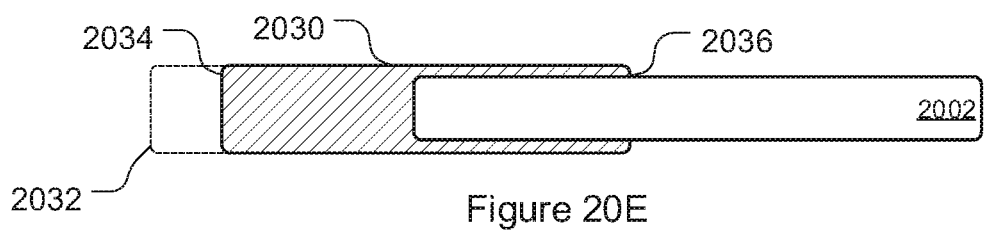

FIG. 20E is similar to FIG. 20D except that forecast UI element 2030 indicates a forecast start date range. In this case, only the first end 2032 of the second start date range—representing the earlier date of the second start date range—is displayed (on the basis that a user will most likely be interested in the earliest forecast start date). Both the earlier and later dates (first and second ends 2034 and 2036 respectively) of the first start date range are displayed.

Figure 20F:
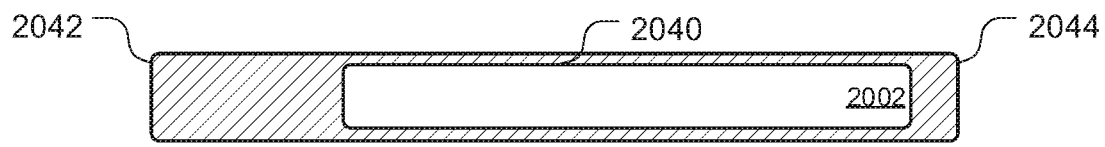

By way of further example, FIG. 20F shows a forecast UI element 2040 which depicts a work item date range (as opposed to a work item start date range or work item end date range). Forecast UI element 2040 includes a first (in this case left) end 2042 indicating a forecast start date for the work item, and a second (in this case right) end 2044 indicating a forecast end date for the work item.

Figure 21:
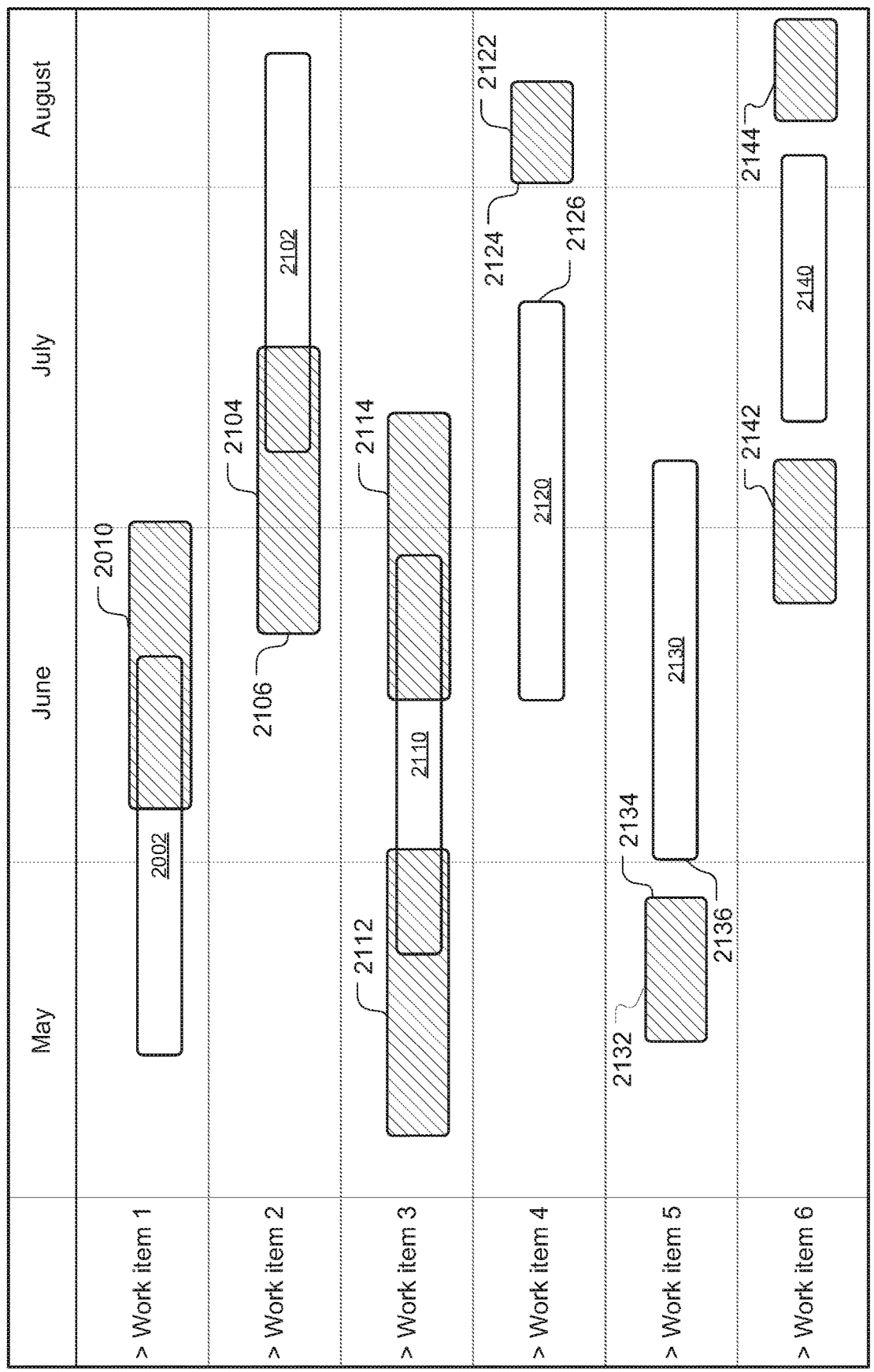
FIG. 21 depicts an example time line interface with work item user interface elements having associated forecast user interface elements.

In order to illustrate additional example forecast user interface elements, FIG. 21 depicts a timeline interface with a number of work item UI elements which are associated with forecast UI elements.

In FIG. 21, work item UI element 2002 (and associated forecast UI element 2010) of FIG. 20 is associated with work item 1.

Work item UI element 2102 (and associated forecast UI element 2104) is associated with work item 2. Forecast UI element 2104 depicts a single forecast start date range. Accordingly, the earlier forecast date (indicated by first end 2106) is an earlier forecast start date and the later forecast date (indicated by second end 2108) is a later forecast start date.

Work item UI element 2110 (associated with work item 3) is associated with two forecast UI elements: element 2112 which depicts a single forecast start date range (similar to 2104 described above) and a forecast end UI element 2114 which depicts single forecast end date range (similar to 2010 described above).

Work item UI element 2120 (and associated forecast UI element 2122) is associated with work item 4. As can be seen, the work item UI element 2120 does not overlap with its associated forecast element 2122. This indicates that the earlier forecast end date (indicated by the first end 2124 of the forecast end UI element 2120) is later than the scheduled end date (indicated by the second end 2126 of the work item UI element 2120).

Work item UI element 2130 (and associated forecast UI element 2132) is associated with work item 5. As can be seen, the work item UI element 2130 does not overlap with its associated forecast element 2132. This indicates that the later forecast start date (indicated by the second end 2134 of the forecast UI element 2130) is earlier than the scheduled start date (indicated by the first end 2136 of the work item UI element 2130).

Work item UI element 2140 (associated with work item 6) is associated with two, non-overlapping forecast UI elements: a forecast UI element 2142 which depicts a single forecast start date range (similar to 2132 described above) and a forecast UI element 2144 which depicts a single forecast end date range (similar to 2122 described above).

The CA 114 can be configured to detect and respond to interaction with a forecast UI element.

Figure 22A:
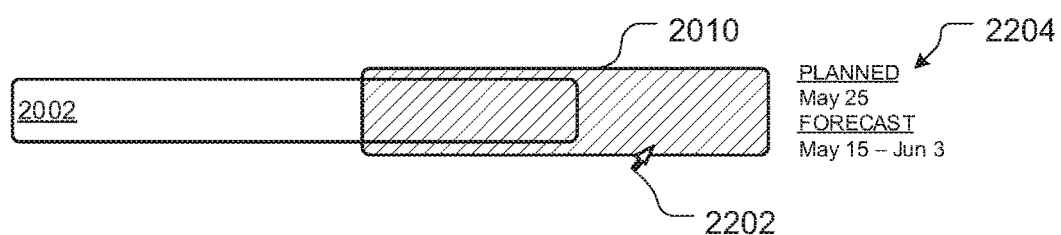
FIGS. 22A to 22C depict further user interface element examples.
Figure 22B:
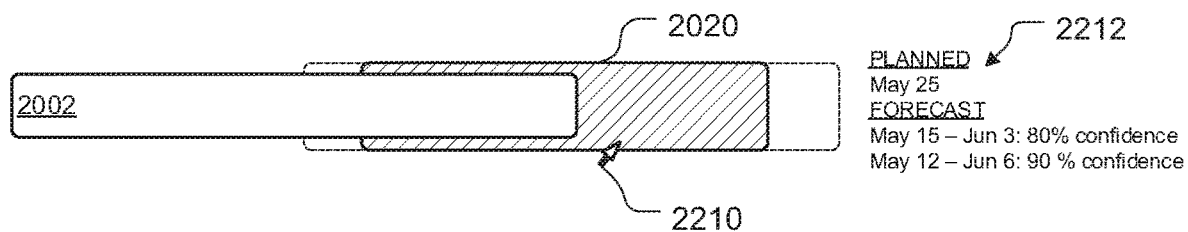

By way of example, the CA 114 can be configured to detect a first interaction with a forecast UI element and, in response thereto, display first additional forecast information. By way of example, the first interaction may be hovering a cursor over a forecast UI element or tapping on the forecast UI element. The first additional forecast information may be the date range represented by the forecast and/or a confidence associated with the forecast. FIGS. 22A to 22B provide example illustrations of this.

FIG. 22A depicts the work item UI element 2002 and forecast UI element 2010 of FIG. 20A. In this example, the CA 114 has detected a first interaction (e.g. hovering a cursor 2202 over the forecast UI element 2010) and, in response, displays text 2204 describing the start and end dates of the forecast end range indicated by the forecast UI element 2010.

FIG. 22B depicts the work item UI element 2002 and forecast UI element 2020 of FIG. 20C. In this example, the CA 114 has detected a first interaction (e.g. hovering a cursor 2210 over the forecast UI element 2020) and, in response, displays text 2212 describing the start and end dates of both forecast end date ranges as well as the confidence intervals associated with those dates.

Figure 22C:
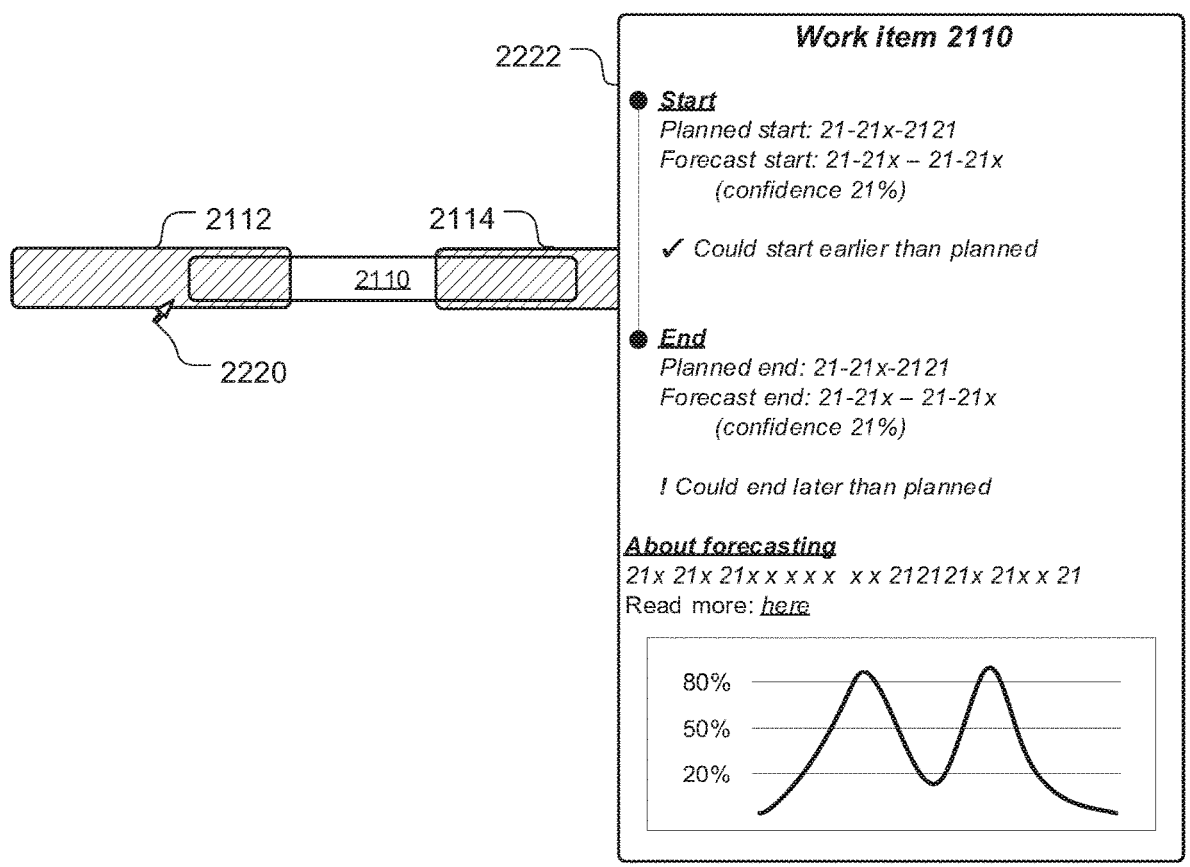

The CA 114 may also, or alternatively, be configured to detect a second interaction with a forecast UI element and, in response thereto, display second additional forecast information. By way of example, the second interaction may be clicking a pointing device control while a cursor is over a forecast UI element or dwelling on the forecast UI element. The second additional forecast information include part or all of the first information described above, and/or additional information associated with the forecast and/or how the forecast was generated. FIG. 22C provides an example of this.

FIG. 22C depicts the work item UI element 2110 and forecast UI elements 2112 and 2114 FIG. 21. In this example, the CA 114 has detected a second interaction (e.g. clicking a mouse button while cursor 2220 is over the forecast UI element 2112) and, in response, displays a forecast information pane 2222. In this particular example, the forecast information pane displays: the planed start date; the forecast start date range; the forecast start date range confidence; an alert that the work item could potentially begin before the scheduled start date; the scheduled end date; the forecast end date range; the forecast end date range confidence; an alert that the work item could potentially end after the scheduled end date; information about the forecast; a link ("here") which can be activated to display further information on the forecast calculation.

The forecasting UI features described above and with reference to FIGS. 20 to 22 can be combined with some or all of the dependency UI features described above. For example, where a work item UI element is displayed with forecasting UI elements, the work item UI element can still be interacted with to (e.g.) display dependency creation controls and create a dependency relationship with another work item. In this case, though, the forecasting information (as displayed by the various forecasting UI elements described) can be used to assist in planning a project. One example of this is described with reference to FIGS. 23A and 23B.

Figure 23A:
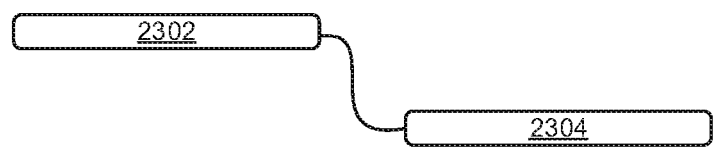
FIGS. 23A and 23B depict further user interface element examples.

FIG. 23A depicts a work item (represented by UI element 2302) that is dependent on another work item (represented by UI element 2304). The scheduled end date of work item 2302 is before the scheduled start date of work item 2304. Accordingly, a user viewing FIG. 23A will not see any issue with this relationship.

Figure 23B:
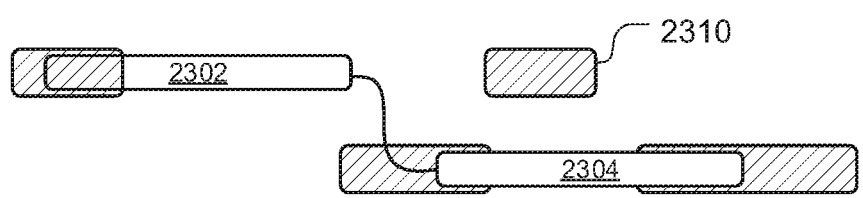

FIG. 23B shows the work items of FIG. 23A but with forecasts shown (e.g. following activation of a control such as display forecast control 316). In FIG. 23A, work item UI element 2302 has an associated forecast UI element 2310 depicting an end date forecast range for the work item associated with work item UI element 2302. In particular, it can be seen that the earlier date of the forecast end date range for work item represented by 2302 (indicated by the left end of forecast UI element 2310) is later than the scheduled start date of the work item associated with UI element 2304 (the start date indicated by the left hand end of the work item UI element 2304). This allows a user to quickly and intuitively perceive that there could well be a problem, as according to the forecast the work item represented by UI element 2302 cannot end before the scheduled start date of the work item represented by UI element 2304. In this case, and as described further below, the CA 114 may be configured to detect a forecast alert condition and, in response thereto, provide a forecast alert—e.g. by displaying the dependency line in a particular manner, or by use of an alternative visual or audible cue.

More generally, with forecasting data a user may be able to discern whether a dependency between work items is not broken, is schedule-broken (i.e. broken based on scheduled dates), or is forecast-broken (i.e. would be broken if the forecast start and/or end dates for one or both of the work items in the relationship was accurate).

By displaying forecasts a user may also (or alternatively) be able to see that a given task can likely be moved to start earlier and/or finish later without impacting the overall project roadmap.

Forecast Generation

Figure 24:
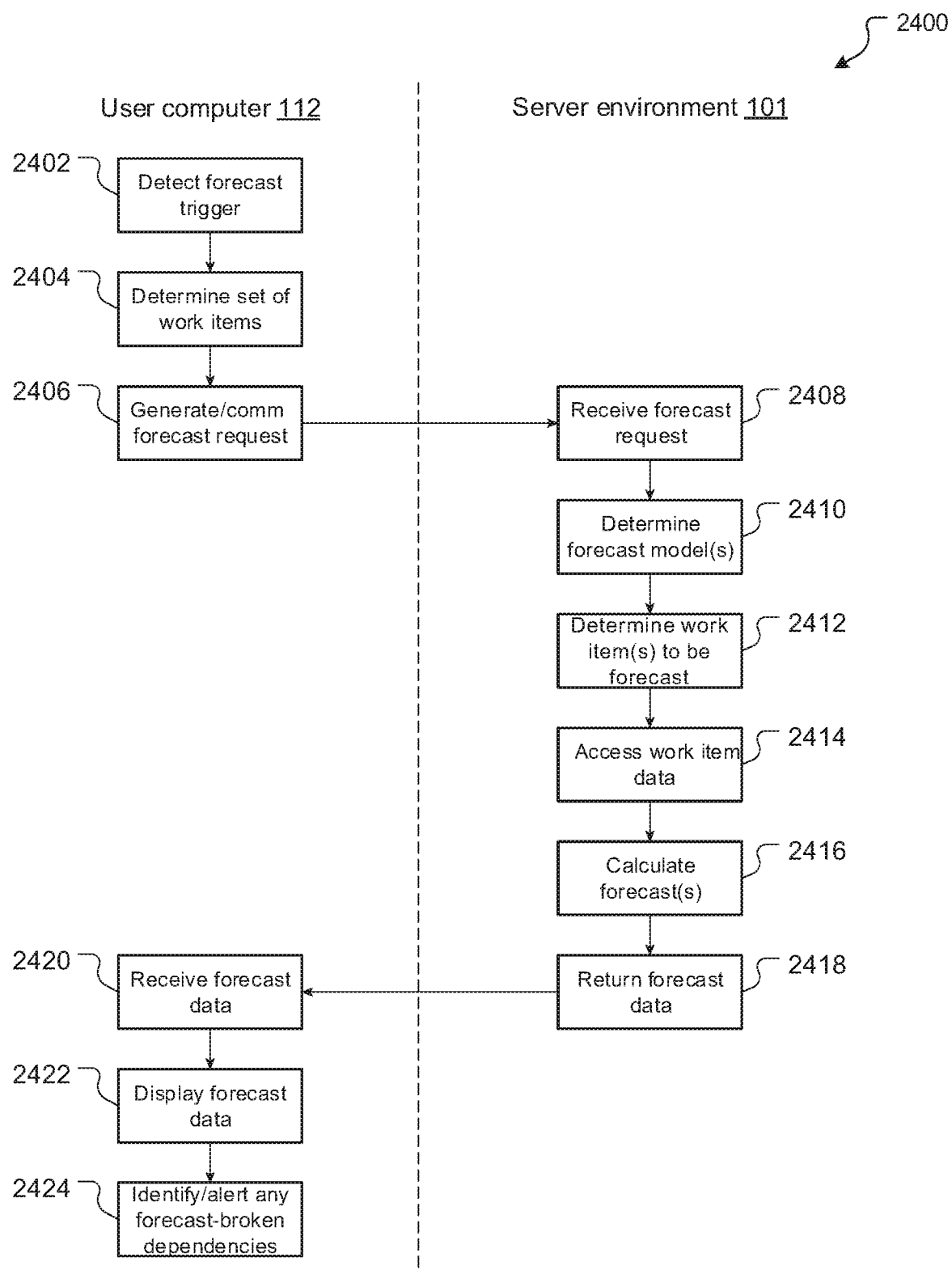
FIG. 24 is a flowchart depicting operations involved in requesting, generating, and displaying forecast data.

Turning to FIG. 24, processing involved in generating and displaying forecast data will be described. FIG. 24 depicts operations performed by both the user computer 112 (and the CA 114 operating thereon) and the server environment 101.

At 2402, the CA 114 detects a forecasting trigger—i.e. a trigger that indicates forecasts should be generated and displayed for one or more work items. In some implementations the CA 114 is configured to automatically request and display forecast data any time a work item is displayed—for example in a timeline interface such as that described above or other work item view. In alternative implementations, the CA 114 is configured to provide a display forecast control (such as control 316), in which case detecting activation of the control is the forecast trigger. Control 316 may be a toggle type control in which successive activations cause forecasts to be displayed then hidden.

Additional (or alternative) forecasting triggers can be configured. For example, the CA 114 may be configured to generate forecast data on detecting that data in respect of a work item has changed (whether or not that work item is currently being displayed). For example, forecast generation may be triggered if the CA 114 detects that a work item's scheduled start date and/or scheduled end date has changed, the assignees of a work item have changed, the skills required for a work item have changed, team memberships have changed, user skills have changed, or any other relevant data has changed (such changes potentially being made by a work item editing UI, via an API, or in any other way). In such cases forecast data can be generated at one point but only displayed at a later point—e.g. when a user views a work item forecast in a timeline or other user interface.

At 2404, the CA 114 determines a set of work items for which forecasts are to be calculated. (The set of work items could include a single work item).

The CA 114 can be configured to determine the set of work items in various ways. For example, where a timeline interface such as 320 above is displayed, the CA 114 may determine the set of work items to include all work items of a particular type (e.g. epics) currently displayed on the timeline interface 320. Alternatively, the CA 114 may determine the set of work items to include all work items of a particular type associated with a project currently being viewed (for example all epics of the current project).

As a further alternative, the CA 114 may provide a work item selection interface by which a user can select one or more work items to calculate forecasts for. For example, the work item selection interface may permit a user to: select one or more individual work items; select one or more projects (thereby indicating all work items of a particular type—e.g. epics—in that/those projects). Alternatively, or in addition, the work item selection interface may provide a mechanism for the user to define one or more criteria and select any work item of a particular type that meets the one or more criteria. For example, a user may request forecasts to be generated for all work items of a particular type assigned to a particular team, for all work items of a particular type scheduled in a particular time period, or for work items that meet any other criteria/combination of criteria. Alternative work item selection mechanisms can be used.

At 2406, the CA 114 generates a forecast request and communicates this to the server environment 101 (and in particular the SA 104). The forecast request includes work item identification data that allows the work item(s) in the set of work items (determined at 2402) to be identified. The work item identification data may be one or more work item identifiers, however need not be. For example, if the set of work items is all work items of a particular type in a particular project, the work item identification data may be the project identifiers. Alternatively, if the work items have been selected according to one or more criteria, the work item identification data may be the selection criteria.

At 2408, the SA 104 receives the forecast request form the CA 114. In the context of the present server environment 101, where forecasting is performed by the forecasting module 126, the SA 104 communicates the forecast request (or relevant data therefrom) to the forecasting module 126.

At 2410, the forecasting module 126 determines one or more forecast models to be used to calculate the requested forecast(s). Forecast models are described in further detail below. This determination can be made in various ways. For example, in certain embodiments the forecasting module 126 may be configured to use one or more predefined forecasting model for live forecasting operations (as opposed to model evaluation operations) and select that or those models. In alternative embodiments, the forecasting module 126 may be configured to determine a forecasting model based on model evaluation data (as described below)—for example by selecting the model that has the best fitness value.

At 2412, the forecasting module 126 determines the individual work items for which forecasts are to be calculated—for example based on the work item identification data received in the forecast request.

At 2414, for each work item, the forecasting module 126 accesses the work item data required by the model to calculate a forecast (noting that different forecasting models may require different work item data). The forecasting module 126 can be configured to retrieve the work item data from the data storage system 108, either directly or via the PM server application 104.

At 2416, the forecasting module 126 calculates the required forecasts. If a single forecasting model is determined at 2410, that model is applied to calculate forecast data for each work item identified at 2412. If multiple forecasting models are determined at 2410, each model is used to calculate forecast data for each work item identified at 2412.

As described above, calculation of a forecast for a work item generates forecast data. The forecast data defines (or allows calculation of) at least one of: one or more forecast durations; one or more forecast start date ranges; a forecast start date; one or more forecast end date ranges; a forecast end date.

The forecast data calculated for a given work item by certain models may be one or more actual start date ranges, an actual start date, one or more actual end date ranges, and/or an actual end date.

For certain models, however, the forecast data calculated for a given work item may be one or more forecast durations for that work item (measured in days/hours/sprints/or any other appropriate work slot). In this case, a forecast duration may be defined by a forecast start date and a forecast end date. Alternatively, a duration may be defined as a time period (e.g. x days, without a start/end date specified), in which case the duration can be used to calculate a forecast start and/or end date in various ways. For example, the forecasting module 126 can be configured to calculate a scheduled middle for the work item (based on scheduled start and end dates) and then calculate a forecast end date by adding ½ the estimated duration to the middle and a forecast start date by subtracting ½ the average duration to the middle. As an alternative example, the forecasting module 126 can be configured to calculate a forecast start date by subtracting the estimated duration from the scheduled end date and/or calculate a forecast end date by adding the estimated duration to the scheduled start date.

Still further, for certain models the forecast data calculated for a given work item may be a plurality of estimated durations for that work item (measured in days/hours/sprints/or any other appropriate work slot), in some cases together with confidence intervals. In this case each estimated duration can be used to calculate a forecast start and/or end date (as described above). The range of start dates calculated from the estimated durations then becomes the forecast start date range and the range of end dates becomes the forecast end date range.

At 2418, forecast data is returned to the CA 114. In the present example this involves the forecasting module 126 communicating the forecast data to the SA 104, the SA 104 then communicating the forecast data to the CA 114.

The forecast data returned to the CA 114 at 2418 may either be actual forecast start/end dates (or date ranges) for the work items in question. Alternatively, the forecast data returned to the CA 114 at 2418 may be data the CA 114 can use to calculate these dates and/or date ranges (e.g. estimated durations as described above).

At 2420, the CA 114 receives the forecast data.

At 2422, the CA 114 causes the forecast data to be displayed—for example by generation and display of one or more forecast UI elements as described above with reference to FIGS. 20 to 23.

At 2424, the CA 114 determines if the forecast data gives rise to one or more forecast-broken dependencies and, if so, displays one or more forecast alerts.

As described above, a forecast-broken dependency may be identified where it is determined that a dependency between two work items would be broken if the forecasts for one or both of those work items was correct. This can involve, for example, the CA 114 determining if one or more of the following occurs: the forecast end date (or a date in the forecast end date range) of the incoming work item is later than the forecast start date (or a date in the forecast start date range) of the outgoing work item; the forecast end date (or a date in the forecast end date range) of the incoming work item is later than the scheduled start date of the outgoing work item; the scheduled end date of the incoming work item is later than the forecast start date (or a date in the forecast start date range) of the outgoing work item.

Where a forecast-broken dependency is identified, the CA 114 can display a forecast alert in a variety of ways. For example, the CA 114 can be configured to display a dependency path representing a forecast-broken dependency with a particular appearance that is visually distinct from dependency paths representing non-broken dependencies. The visual appearance of a dependency path representing a forecast-broken dependency may also be visually distinct from the visual appearance of schedule-broken dependencies. By way of example, the CA 114 may be configured to display: dependency paths that are not broken based on either scheduled or forecast dates with a first appearance (e.g. green); dependency paths that are forecast-broken (but not schedule-broken) with a second appearance (e.g. orange); and dependency paths that are schedule broken with a third appearance (e.g. red).

The CA 114 may be configured to display forecast alerts in additional or alternative ways—for example in a forecast information pane and/or by any other appropriate mechanism.

Forecasting Models

This section provides examples of forecasting models that can be generated and used to calculate forecasts.

In the embodiments described herein, the generation of forecasting models is performed by the model module 122 of the forecasting server 120. The processing described could, however, be performed by an alternative module or application running on an alternative system.

Typically (though not always) generation of a forecasting model will require access to historical work item data—i.e. data in respect of work items that have already been planned/scheduled and completed (or, at the very least, started). In the present embodiments, the model module 122 accesses historical work item data from data storage system 108. The data may be accessed from directly from a production server, however will more typically be accessed from a data warehouse that has extracted and stores relevant data from the production server.

Specific data required to generate a forecasting model (and, where performed, to evaluate the model once generated) will depend on the forecasting approach being used.

Where historical data is used to generate a forecast model, the input data for model generation will typically be a set of work items. As with actual forecast calculation, the set of work items can be defined in various ways. For example, the set of work items may correspond to a project. As an alternative example, the set of work items may correspond to all projects of a given tenant. As a still further example, and where server environment 101 hosts multiple tenants (or has access to project data in respect of multiple tenants), set of work items may correspond to all projects of all tenants.

Static Error Forecasting

In one example, the model module 124 is configured to generate a static error forecasting model. The static error model involves determining and storing one or more a static error values. When the static error module is used to calculate a forecast for a given work item, the static error value (or values) is/are used to calculate forecast start/end dates (or ranges) for the work item.

For example, a static error value may be a duration error—e.g. x %—or duration error range—e.g. x-y %. To forecast a work item, the work item's scheduled duration is determined then a new duration (or range of durations) is calculated by applying the duration error or duration error range to the scheduled duration. By way of example, the duration error may be +15%. In this case the forecast duration is calculated by multiplying the scheduled duration by 1.15. As an alternative example, the duration error maybe a range from +15% to −15%, in which case two forecast durations are calculated by multiplying the scheduled duration by 1.15 and 0.75 respectively.

As an alternative example, a static error value may be a static error start date value (or range of values) or a static error end date value (or range of values).

Static error values may be predefined or manually defined by a user during generation of a model.

Average Duration Forecasting

In another example, the model module 124 is configured to generate a model based on the historical work item runtimes.

For example, the model module 124 can be configured to access historical data to determine the actual duration of all work items of the type in question and, using this data, compute a set of actual durations for work items of that type.

The actual duration of a given work item can be determined in various ways. In certain embodiments, the actual duration may be able to be determined by reference to explicit data fields associated with a work item (e.g. an actual start date and actual end date field)

In other cases, actual duration may need to be derived from other data associated with the work item. By way of example, if actual start and actual end dates are not explicitly recorded, the actual start date of a work item can be determined to be the date at which the work item first transitioned to an in progress state. Similarly, the actual end date of a work item can be determined to be the date at which the work item last transitioned to a done state.

The set of actual work item durations (e.g. the average duration model) can be used to generate a forecast for a given work item in various ways.

In one example, the forecast module 126 accesses the set of actual work item durations and calculates an average duration. The forecast module 126 then forecasts that the work item in question will have this average duration. Forecast start and end dates for the work item can then be calculated based on the average duration (e.g. by identifying a mid-point of the scheduled duration and adding ½ the average duration to calculate the forecast start date and subtracting ½ the average duration to calculate the forecast end date).

In another example, the forecast module 126 uses the set of actual work item durations to generate a probability distribution of average work item durations. To do this, the forecast module 126 uses the set of actual work item durations to calculate a number of average work item durations. Each average work item duration is calculated by randomly selecting a set number of work item durations from the set of actual work item durations, and then calculating the average of the selected durations.

The number of average durations calculated (e.g. the number of sample sets), and the number of work item durations randomly selected for the calculation of each average (e.g. the sampling window), can be varied. By way of example, however, for a set of actual work item durations that includes n durations, x averages may be calculated, each average calculated based on x*0.2 (i.e. 20%) actual work item durations (e.g. if the set of actual work item durations includes 50 actual work item durations, x averages may be are calculated with each average work item duration may be calculated based on 10 actual work item durations randomly selected from the set.

The average durations can then be used to generate a probability distribution. The probability distribution can be used, in turn, to calculate/extract one or more forecast durations based on confidence intervals. For example, a first forecast duration may be based on a first confidence interval (e.g. the 80% confidence interval), a second forecast duration may be based on a second confidence interval (e.g. the 90% confidence interval), a third forecast duration may be based on a third confidence interval (e.g. the 95% confidence interval) and so forth. The one or more forecast durations can then be displayed (together, in some embodiments, with associated confidence intervals) as described above.

Average Scheduling Error Forecasting

In another example, the model module 124 is configured to generate a model based on scheduling errors of historical work item.

For example, the model module 124 can be configured to access historical data to determine the scheduled duration and actual duration of all work items of the type in question and, from this data, calculate an average scheduling error.

The actual duration of a given work item can be determined as described above.

The scheduled duration of a given work item can be determined in various ways. For example, the scheduled duration may be determined to be the duration between initially recorded start and end dates for the work item. Alternatively, the scheduled start and end dates may be taken as the scheduled start and end dates that were recorded within a grace period of being initially set (e.g. the scheduled start/end dates as recorded 10 days after being initially set).

Once actual and scheduled durations of a given work item have been determined, a scheduling error for the work item can be calculated—e.g. actual duration/scheduled duration.

Once scheduling errors for all work items in question have been determined, one or more scheduling error values can be calculated. For example, a single average scheduling error may be used, or a range of scheduling error values.

To apply this model to generate a forecast for a given work item, the forecast module 126 retrieves the scheduling error value(s) and calculates one or more estimated work item durations using that/those values and the scheduled work item duration (for example as described above).

Estimated Work Based Forecasting

In another example, the model module 124 is configured to generate a model based on an estimated amount of work involved in a work item.

For example, the model module 124 calculates a child-to-duration ratio and a set of work item velocities from the historical data.

For a given work item (for example an epic), the child-to-duration ratio is based on the child count for that work item (e.g. the number of stories associated with the epic) and the duration of the work item. From these data points, the model module 122 calculates an average child-to-duration ratio for all completed work items. This is a single numerical value—e.g. 2 child work items per 3 days=⅔.

To generate the set of velocities, the model module calculates a velocity corresponding to each completed work item of the type in question (e.g. each completed epic). For a given work item, the model module 122 calculates velocity by dividing the number of child work items (e.g. stories) by the duration of the work item (e.g. the epic duration). For example, if a given epic had 30 stories and was done within 30 days the velocity would be 1.

When forecasting a new work item for which child work items are yet to be defined, the forecasting module 126 determines the new work item's scheduled duration (i.e. the duration between the scheduled start and end dates). Based on the scheduled duration and the child-to-duration ratio, the FM 126 predicts a child work item count for the new work item. For example, if the scheduled duration is 6 working days, and the child-to-duration ratio is ⅔, the predicted number of child work items for the work item will be 4.

The forecasting module 126 then randomly selects a number of velocities from the set of velocities and calculates an average velocity of the randomly selected velocities. The forecasting module 126 then forecasts a duration of the new work item by multiplying the predicted number of child work items by the calculated average velocity. As described above, the estimated duration can be used to calculate forecast start and/end dates for the work item.

In order to generate a start date range and/or end date range, the forecasting module 126 can perform the process of randomly selecting velocities, calculating an average velocity from those randomly selected velocities, and using the average velocity to forecast a duration. Repeating this process generates a number of forecast durations which, in turn, can be used to calculate a number of forecast end dates (i.e. a range of forecast end dates) and/or a number of forecast start dates (i.e. a range of forecast start dates).

Linear Regression Forecasting Models

In another example, the model module 124 is configured to generate one or more linear regression forecasting models to predict work item duration—or, more specifically, the first transition of a work item to an in progress state and the last transition of a work item to a done state, from which a duration can be calculated.

The model module 122 can be configured to generate a linear regression model based on various input features.

For example, a linear regression model may be generated based on the following work item features: work item assignee data (which may include assignees of all child work items of the work item in question); scheduled work item duration; child work item count (e.g. where the work item is an epic, the number of stories that epic has).

Alternative linear regression models can be calculated based on additional and/or alternative input features.

To apply this model to generate a forecast for a given work item, the forecast module 126 retrieves the linear regression model and applies it to relevant data for the given work item to generate an estimated duration. If the number of child work items for the work item in question is unknown (and this data is required by the regression model in question), an estimated number of child work items can be calculated based on the duration as discussed above.

Regression Tree Forecasting Models

In another example, the model module 124 is configured to generate one or more regression tree forecasting models to predict work item duration—or, more specifically, the first transition of a work item to an in progress state and the last transition of a work item to a done state, from which a duration can be calculated.

The model module 122 can be configured to generate a regression tree model based on various input features.

For example, a regression tree model may be generated based on the following work item features: work item creator; work item assignee data (which may include assignees of all child work items of the work item in question); scheduled work item duration; child work item count (e.g. where the work item is an epic, the number of stories that epic has).

As another example, a regression tree model maybe generated based on the following work item features: the originally scheduled duration (e.g. the difference between initially scheduled start and end dates or the difference between scheduled start and end dates as set within a grace period of initially being set); and child work item count (e.g. where the work item is an epic, the number of stories that epic has).

Alternative regression tree models can be calculated based on additional and/or alternative input features.

Model Evaluation

Once a given model has been initially generated by the model module 122, the model can be evaluated. Generally speaking this involves applying the model as generated to historical work item data and comparing the model's predications against the actual data.

In the present embodiment model evaluation is performed by the evaluation module 124, however the relevant functions could be performed by an alternative module or system.

Model evaluation can be performed in various ways. In the present embodiments, evaluation of a model generates an average error fitness value that indicates a single 'error in days' value for each work item forecast generated during evaluating of the model.

To do this, each time a model evaluation is performed the evaluation module 124 calculates the following data points for each work item (e.g. for each epic): the actual duration of the work item (a single, numeric value which is the target values forecast by the forecasting models); the probabilistic distribution of forecasts (a collection of forecasted durations which form the basis of the forecast ranges ultimately presented when performing forecasting operations).

From these data points, hit rate (being a measure of whether the target value actually hit the forecasted range) and spread (the width of the forecasted range) can be calculated. The ideal forecast is one that exactly hits the target value, and has no spread at all. The greater the spread, or the further away from the target value, the worse a forecast is.

As one example, the average error can then be calculated by: sorting the set of forecasted values; removing the lower 20% and upper 20%; for each remaining forecast value, compute the absolute difference in days to the target value; and average the difference. This generates a single value of "error in days" for each work item. These values can then be aggregated using different aggregations (e.g. averages, median, percentiles) over roadmaps, tenants, etc. to get to generate an overall fitness function.

The overall fitness function of a model can be associated with the model and, for example, used by the forecasting module 126 to determine what forecasting model to use when forecasting data is to be generated (e.g. at 2410 described above).

Furthermore, models can be evaluated on a periodic basis, and their fitness functions updated, as the historical data available changes.

Additional/Alternative Features for Generating/Evaluating/Applying Models

As noted, the specific work item data required for generation of a model will depend on the model being generated. Several features that can be used to create, evaluate, and or apply a given forecasting model are discussed above. This section provides examples of additional features that can be used for model generation/evaluation/application.

Data Re Sets of Work Items

For a given set of work items that is being used to generate a forecasting model, evaluate a forecasting model, or that a forecasting model is being applied to, the following features may accessed/calculated/employed:

| Input | Description |
| --- | --- |
| item set team assignments | A set of team identifiers |
| Work item set start date | Date |
| Work item set end date | Date |
| Forecasting factors | Settings, Enums |
| Work item set sub-work items | A set of all sub-work items Set of stories (or, more generally, set of forecasting items) |

Where generating a forecasting model work item set teams assignments may include identifies of all teams that worked on all child work items of all work items in the set of work items. E.g. if the set of work items is a set of epics, the team assignments will include the teams assigned to all stories of those epics.

Where applying a model, the work item set team assignments may include identifiers of all teams available to work on the work items in the set of work items.

A given team identifier points to (or allows identification of) the one or more users who are members of that team.

A user is a person who can be assigned to a work item. A user has a global capacity and availability. For example, a given user may be a full time employee and have a global capacity of 40 hours per week and availability of normal Australian working hours (e.g. Monday to Friday 9 am to 5 pm, Australian Eastern Daylight Time). Availability (and capacity) can take into account holidays, vacations etc.: for example public holidays or periods of leave relevant to specific users.

Furthermore, a given user will have a defined capacity for a given team (expressed as a percentage). For example, if user A is a full time employee and assigned solely to team 1, then the capacity of user A for team 1 is 1 (i.e. 100%). Conversely, if user B is a full time employee and assigned evenly between teams 1 and 2, then the capacity of user B within team 1 is 0.5 (i.e. 50%) and the capacity of user B within team 2 is 0.5 (i.e. 50%).

The work item set team assignments may be accessed from a specific team assignment field (associated, for example, with the epic or epics to which the stories in the bucket belong). Alternatively, the team assignments input may be calculated or derived from other data such as team/roadmap/board/project links or team assignments further up the work item hierarchy.

The work item set start date is a date indicating the start date of the work item set—e.g. when work on the first work item has been scheduled to commence. BY way of example, where the work items in the set of work items are epics, the start date for a given epic will be the date on which the first story of that epic is scheduled to start.

Similarly, the work item set end date is a date indicating the end or due date of the set of work items—e.g. when all stories in the bucket have been scheduled to be completed.

In some embodiments, additional forecasting configurations for the set of work items bucket may be set. Such factors are defined in the forecasting factors field.

By way of example, forecasting factors for a given model be define a size of a sampling window and the number of sample sets taken (e.g. n and x in the average duration forecasting model described above). Additional, or alternative, forecasting factors may be relevant to different models.

The work item set sub-work items is a set of identifiers for all sub work items to the work items in the work item set. For example, if the work items in the work item set are epics, the work item set sub-work items is a set of identifies of all stories belonging to the epics in the set of work items.

Data Re Sub-Work Items

For a given work item in the set of work items, features in respect of the given work item's children (or sub-) work items may also be used.

For example, if the work items in the set of work items are epics, story work item features such as the following may be used:

| Input | Example data type |
| --- | --- |
| Rank | Lexographic, numeric, or other rank value |
| Assignments | User/member identifier |
| Complexity | Number |
| Dependencies | Set of 0 or more story identifiers |
| Skill/Department | Set of skill/department identifiers |
| Time restriction(s) | Date(s) |
| Slot restriction | Work slot identifiers |

Rank defines a rank of the story—e.g. as a lexographic, numeric, or other rank value. The rank allows a priority of the story (relative to other stories) to be determined.

Assignments define any restriction of users who can (or cannot) work on the particular story.

Complexity defines a normalized complexity for the story—e.g. a normalized measure of the effort needed to complete a story. The complexity of a given story may potentially have different values for different teams.

Complexity can be calculated or derived in various ways. For example, complexity can be calculated based on a work items scheduled duration (e.g. the difference between scheduled start/end times, on story points (where used), on issue transition throughput, and/or other metrics.

Dependencies is a set of story identifiers recording any dependencies between stories within the set of work items.

Skill/department data can be used to store any skill/department restrictions associated with a story—i.e. any restrictions as to what skills a team (or user) must have to work on the story and/or what department a team (or user) must be part of to work on the story. During forecasting, the skill/department data is cross-referenced with user/team skill/department values to further restrict the set of potential assignees for the story.

Time restriction data can be used to record any time requirements, for example that the story must not start before date x, must not start after date x, must finish before date y, must not finish before date y.

Slot restriction data stores a set of work slot identifiers. This can be used, for example, to handle cases where a story has been explicitly assigned to one or more a particular work slots (e.g. sprints, days, or other defined work slots).

Data Re Overlap Between Work Item Sets

Work item set overlap may be determined for a particular set of work items and a particular team. This defines a percentage of free capacity the particular team has available to work on the particular set of work items.

By way of example, work item set overlap data may include:

| Input | Example data type |
| --- | --- |
| Capacity share function | Value function over time per team |

This is used to deal with capacity distribution where teams work on stories (or sprints) from different sets of work items in parallel. The capacity share function can be a static value, generated, for example, based on various rules (e.g. equal distribution, rank-based percentages, or other rules). Alternatively, the capacity share function may be a user-defined function stored in a suitable field.

Data Re Teams and Members

Team and member data for a given team may also be used. For example:

| Input | Example data type |
| --- | --- |
| Member capacity function | Value function over time per team (the same abstracted unit as story complexity described above) |
| Team work slots | Work slot identifiers |
| Skill/Department | Set of skill/department identifiers |
| Forecasting factors | Settings, Enums |

The member capacity function provides data on the free capacity of a team over time. This takes into account, for example, absences, vacations, availabilities, etc. of team members. The member capacity function is in the same abstracted unit as story complexity described above.

The team work slots provides data on the team's work slots: e.g. sprints, weeks, days or other atomic time ranges work can be scheduled into. Team work slot data can be retrieved from/provided by various sources. For example it can be from a roadmap, a default work slot (e.g. sprint) length defined for the team, explicitly defined work slots (of the same or different lengths) defined in a board or other project management tool.

The skills/departments data defines the skills/departments of a given team member. During forecasting, the team member skills/departments are cross-referenced with the story skill/department restriction. This data can be obtained from the team management data store or a user/member property.

If supported, the forecasting factors define specific forecasting configurations for a team or member/user.

Many examples and features described above are provided in the context of a timeline interface such as 320 in which time is on a horizontal axis running from left (earlier times) to right (later times). For alternatively oriented timelines, however, alternative positions/directions may be required or be more intuitive to users. Generally speaking, where described in the context of a timeline running from left (earlier times) to right (later times), reference herein to the left direction should be considered reference to the direction of earlier time and reference to the right direction should be considered reference to the direction of later time.

For example, if a timeline interface displayed work items along a horizontal axis (i.e. in columns rather than rows) and time along the vertical axis (for example earlier times above later times so time is seen as running 'down' the interface) features described as being at or near the left end of a work item UI element could instead be displayed at or near an upper end of the work item UI element, and features described as being at or near the right end of a work item UI element could instead be displayed at or near a lower end of the work item UI element.

Alternatively, if a timeline interface displayed work items along a horizontal axis and time along the vertical axis but with later times above earlier times (i.e. time running 'up' the interface) features described as being at or near the left end of a work item UI element could instead be displayed at or near a lower end of the work item UI element, and features described as being at or near the right end of a work item UI element could instead be displayed at or near an upper end of the work item UI element.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, work items, integers, steps, or elements.

The present disclosure uses terms "first," "second," etc. to describe various elements. Absent other context/requirements, however, these terms are used to distinguish different elements or features from one another and not in an ordinal sense. For example, absent other context/requirements use of first and second in respect of a first user interaction and a second user interaction does alone indicate any order or precedence: absent other context/requirements, the first user interaction could occur before or after the second user input. Furthermore, reference to a 'first' element or feature does not necessarily imply there must be a second element or feature (e.g. use of the word 'first' in 'a first user input' does not alone imply that there must be a second user input).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer-implemented method executed by an instance of software instantiated by cooperation of a processor and a memory of a computing device comprising a display, the method comprising:
rendering, in a graphical user interface shown on the display and generated by the instance of software, a plurality of work items interface elements;
receiving at the graphical user interface a user input dragging an edge of a selected first work item interface element at least a threshold distance to change a duration of the selected first work item interface element;
in response to the user input, by the instance of software, transmitting information identifying a first work item associated with the selected first work item interface element and the duration to a server;
receiving from the server at the instance of software, information comprising:
a second work item having a dependency relationship with the first work item; and
a predicted range of a change to a start date or an end date of the second work item based on the received user input with respect to the selected first work item interface element; and
rendering in the graphical user interface, an overlay graphical object that is superimposed over an end of a second work item interface element associated with the second work item, the overlay graphical object having a length that is determined in accordance with the predicted range.

2. The computer-implemented method of claim 1, wherein the graphical user interface comprises a linking graphical user interface element connecting the first work item interface element to the second work item interface element.

3. The computer-implemented method of claim 1, wherein the edge corresponds to a start date of the first work item.

4. The computer-implemented method of claim 1, wherein the edge corresponds to an end date of the first work item.

5. The computer-implemented method of claim 1, further comprising:
receiving from the server at the instance of software, second information comprising:
a third work item having a dependency relationship with the first work item; and
a second predicted range of a change to a start date or an end date of the third work item based on the received user input with respect to the selected first work item interface element; and
render in the graphical user interface, a second overlay graphical object that is superimposed over an end of a third work item interface element associated with the third work item, the second overlay graphical object having a length that is determined in accordance with the second predicted range.

6. The computer-implemented method of claim 1, further comprising:
receiving from the server at the instance of software, second information comprising:
a third work item having a dependency relationship with the second work item; and
a second predicted range of a change to a start date or an end date of the third work item based on the predicted range of the change to the start date or the end date of the second work item; and
render in the graphical user interface, a second overlay graphical object that is superimposed over an end of a third work item interface element associated with the third work item, the second overlay graphical object having a length that is determined in accordance with the second predicted range of the change to the start date or the end date of the third work item.

7. The computer-implemented method of claim 1, wherein the plurality of work item interface elements are arranged in a scheduling interface.

8. A computing device comprising:
a display;
a processor; and
a memory cooperating with the processor to instantiate an instance of software configured to:
render, in a graphical user interface shown on the display and generated by the instance of software, a plurality of work items interface elements;
receive at the graphical user interface a user input dragging an edge of a selected first work item interface element at least a threshold distance to change a duration of the selected first work item interface element;
in response to the user input, by the instance of software, transmitting information identifying a first work item associated with the selected first work item interface element and the duration to a server;

receive from the server at the instance of software, information comprising:
    a second work item having a dependency relationship with the first work item; and
    a predicted range of a change to a start date or an end date of the second work item based on the received user input with respect to the selected first work item interface element; and
render in the graphical user interface, an overlay graphical object that is superimposed over an end of a second work item interface element associated with the second work item, the overlay graphical object having a length that varies in accordance with the predicted range.

9. The computing device of claim 8, wherein the graphical user interface comprises a linking graphical user interface element connecting the first work item interface element to the second work item interface element.

10. The computing device of claim 8, wherein the edge corresponds to a start date of the first work item.

11. The computing device of claim 8, wherein the edge corresponds to an end date of the first work item.

12. The computing device of claim 8, further comprising:
receiving from the server at the instance of software, second information comprising:
    a third work item having a dependency relationship with the first work item; and
    a second predicted range of a change to a start date or an end date of the third work item based on the received user input with respect to the selected first work item interface element; and
render in the graphical user interface, an overlay graphical object that is superimposed over an end of a third work item interface element for the third work item, the second overlay graphical object having a length that is determined in accordance with the second predicted range.

13. The computing device of claim 8, further comprising:
receiving from the server at the instance of software, second information comprising:
    a third work item having a dependency relationship with the second work item; and
    a second predicted range of a change to a start date or an end date of the third work item based on the predicted range of the change to the start date or the end date of the second work item; and
render in the graphical user interface, a second overlay graphical object that is superimposed over an end of a third work item interface element of the third work item, the second overlay graphical object having a length that is determined in accordance with the second predicted range of the change to the start date or the end date of the third work item.

14. The computing device of claim 8, wherein the plurality of work item interface elements are arranged in a scheduling interface.

15. A computer-implemented method executed by an instance of software instantiated by cooperation of a processor and a memory of a computing device comprising a display, the method comprising:
rendering, in a graphical user interface shown on the display and generated by the instance of software, a plurality of events in a scheduling interface;
receiving at the graphical user interface a user input to move an end-date edge of a first event to change a duration of the first event;
in response to the user input, by the instance of software, transmitting information identifying the first event and the duration to a forecasting server;
receiving from the forecasting server, information comprising a predicted range of a change resulting from the duration change to a start date or end date of a second event having a dependency relationship to the first event; and
rendering in the graphical user interface, an overlay graphical object superimposed over a second event and having a length that is determined in accordance with the predicted range.

16. The method of claim 15, wherein the user input moves the end-date edge of the first event at least a threshold distance.

17. The method of claim 15, wherein the overlay graphical object is a rectangular object that overlays the second event.

18. The method of claim 15, wherein the first event precedes the second event.

19. The method of claim 16, wherein the scheduling interface comprises a line connecting the end-date edge of the first event to a start-date edge of the second event.

20. The method of claim 15, wherein:
the overlay graphical object is a first overlay graphical object;
the predicted range of the change is a first predicted range of the change;
the start date is a first start date;
the end date is a first end date; and
the method further comprises:
    receiving from the forecasting server, information comprising a second predicted range of a change resulting from the duration change to a second start date or a second end date of a third event having a dependency relationship to one of the first event or the second event; and
    rendering in the graphical user interface, a second overlay graphical object of the second predicted range of the change to the second start date or the second end date of the third event.

* * * * *